United States Patent
Yoshioka et al.

(10) Patent No.: US 8,223,968 B2
(45) Date of Patent: Jul. 17, 2012

(54) IMAGE DATA VERIFICATION PROGRAM RECORDED ON A RECORDING MEDIUM, IMAGE DATA VERIFICATION METHOD, AND IMAGE DATA VERIFICATION SYSTEM

(75) Inventors: Takashi Yoshioka, Kawasaki (JP); Masahiko Takenaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 847 days.

(21) Appl. No.: 12/318,156

(22) Filed: Dec. 22, 2008

(65) Prior Publication Data

US 2010/0014668 A1    Jan. 21, 2010

(30) Foreign Application Priority Data

Dec. 27, 2007 (JP) ................. 2007-335814

(51) Int. Cl.
H04N 1/44 (2006.01)
H04K 1/00 (2006.01)
H04L 9/00 (2006.01)
H04L 9/32 (2006.01)
G06F 7/04 (2006.01)

(52) U.S. Cl. .............. 380/243; 380/28; 380/30; 380/42; 713/176; 726/27; 726/32

(58) Field of Classification Search .............. 380/28, 380/30, 42, 243; 713/176; 726/27, 32; 705/71, 705/72, 76
See application file for complete search history.

(56) References Cited

U.S. PATENT DOCUMENTS

| 6,178,243 | B1 | 1/2001 | Pomerantz et al. |
| 2007/0076874 | A1 | 4/2007 | Suleiman et al. |
| 2007/0130627 | A1 | 6/2007 | Yoshioka |
| 2007/0168672 | A1* | 7/2007 | Izu et al. .................. 713/176 |
| 2007/0183000 | A1 | 8/2007 | Eisen et al. |
| 2008/0082829 | A1* | 4/2008 | Yoshioka et al. ........... 713/176 |

FOREIGN PATENT DOCUMENTS

| JP | 2007-27920 | 2/2007 |
| JP | 2007-156970 | 6/2007 |

OTHER PUBLICATIONS

European Search Report issued May 11, 2009 in corresponding European Patent Application 08172581.4.

* cited by examiner

*Primary Examiner* — Kambiz Zand
*Assistant Examiner* — Teshome Hailu
(74) *Attorney, Agent, or Firm* — Staas & Halsey LLP

(57) ABSTRACT

An image data verification system for verifying image data using a computer and method are provided. The method includes registering image data of an original and extracting information regarding a part of information forming the original image data. The method also includes generating a feature value of the partial information and generating signature information.

10 Claims, 28 Drawing Sheets

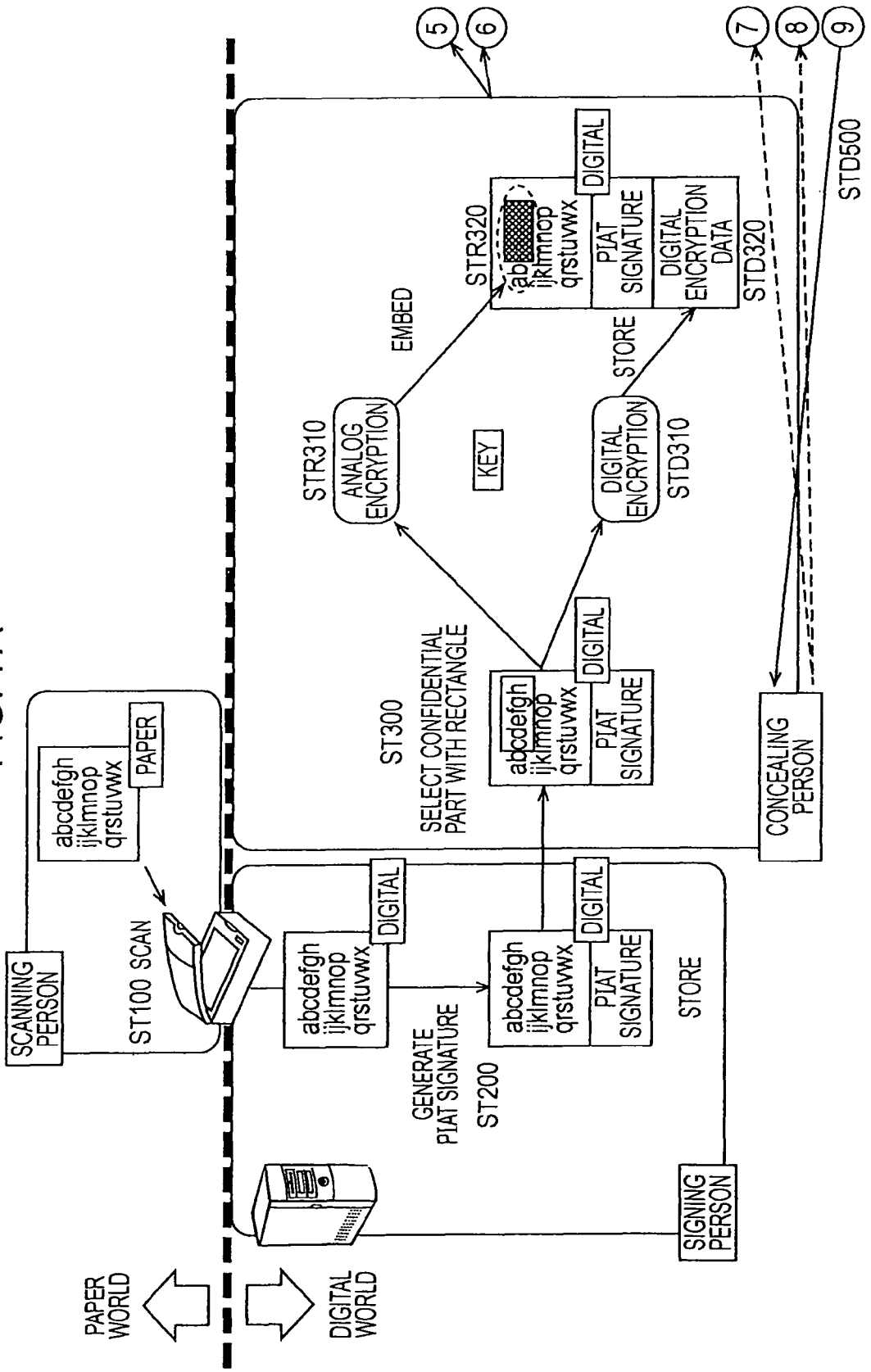

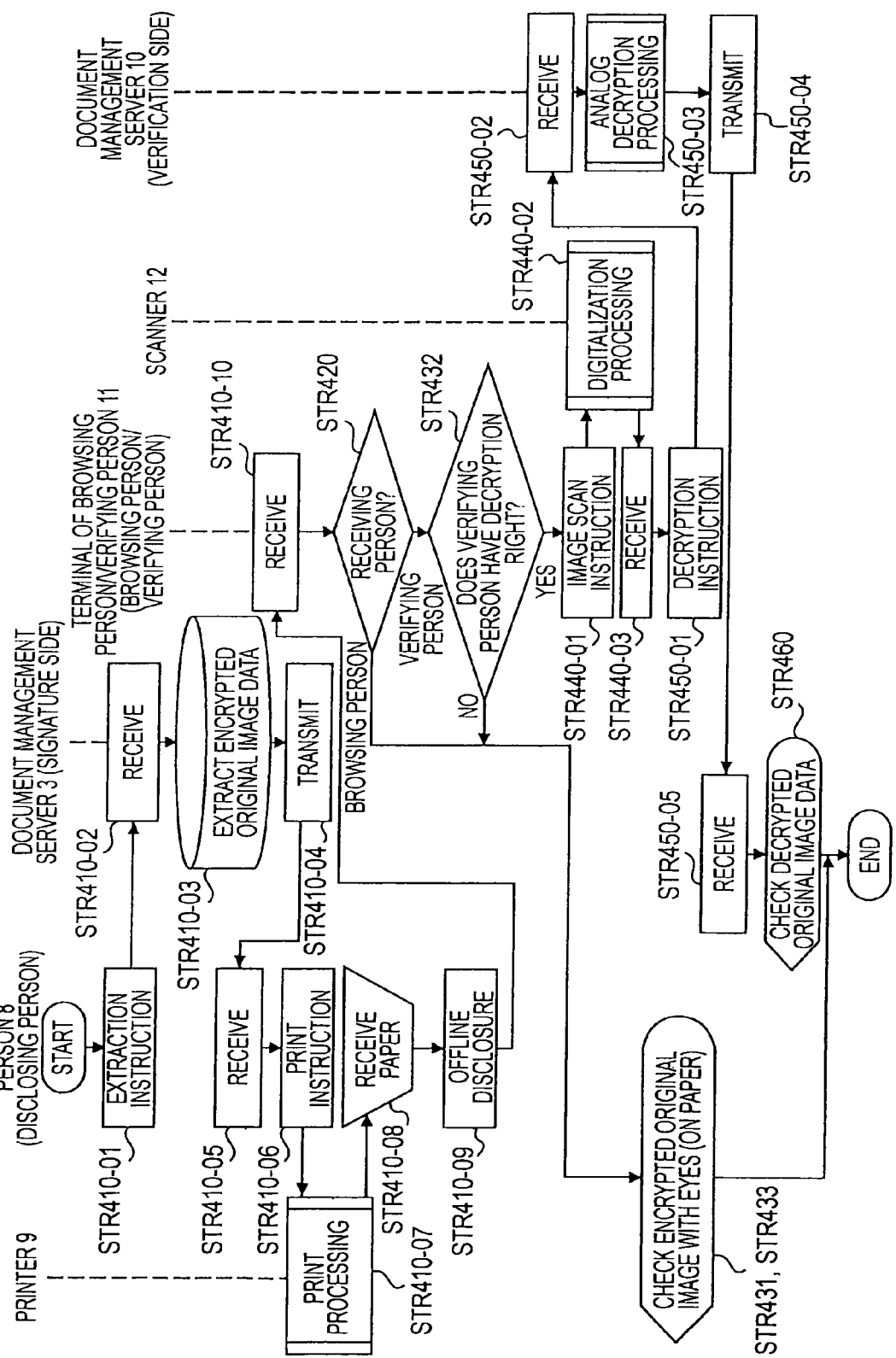

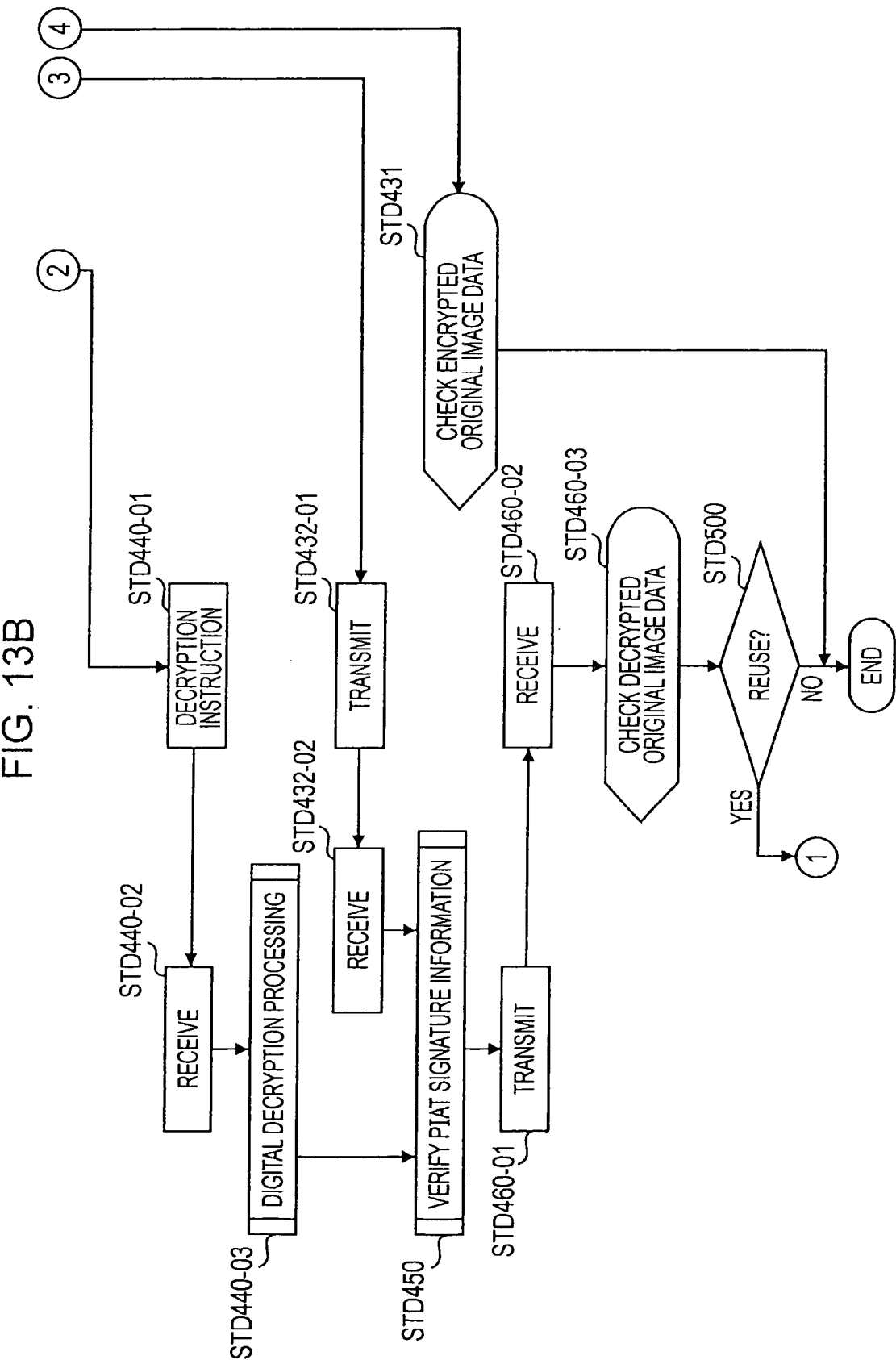

IMAGE DATA VERIFICATION PROGRAM RECORDED ON A RECORDING MEDIUM, IMAGE DATA VERIFICATION METHOD, AND IMAGE DATA VERIFICATION SYSTEM

This application is related to and claims priority to Japanese patent application no. 2007-335814 filed on Dec. 27, 2007 in the Japan Patent Office, and incorporated by reference herein.

BACKGROUND

1. Field

The embodiments discussed herein are directed to image data verification.

2. Description of the Related Art

Although documents indicating valid creators and modifiers have been stored as paper documents, scanning of the documents with a scanner and attachment of a digital signature and a timestamp allow the documents to be stored as certified electronic documents.

However, since a digital signature and a timestamp are attached to the entire scan data in a method according to a related art, deletion of a personal-information-containing portion is identified as tampering of the data, as a result of which the digital signature and the timestamp are invalidated.

Accordingly, the technology, with which, a change may be identified in a portion of scanned electronic data, which may be modified or deleted, and can guarantee the integrity and the authenticity of the rest of the scanned electronic data is desired.

Regarding an issue for providing the digital forensics and the privacy protection, research on sanitizable signature technologies for assuring the partial authenticity (integrity) of a portion of an electronic document and for concealing (sanitizing) the privacy-information-containing portion are making progress.

Conventionally, an electronic document sanitizable signature technology (hereinafter, this technology is abbreviated as PIAT (partial integrity assurance technology)) addresses an issue that partial concealment of a given document disables verification of a signature attached the document. When the PIAT is employed, a signature of a signature-attached electronic document can be verified even if the document is sanitized, and it can be assured by a third party that the portion other than the sanitized portion (including modification and addition) is not tampered.

In addition, conventionally generating partial signature information and managing the partial signature information separately from image information, and for identifying the existence or absence of a change in the image information and verifying the changed portion using the image information and the partial signature information is addressed.

Additionally, conventionally verifying that a portion other than a non-disclosed portion is not changed and that the authenticity of decrypted information in the non-disclosed portion is maintained while controlling partial disclosure/nondisclosure of electronic information is addressed.

Furthermore, conventionally key cryptosystems, such as the advanced encryption standard (AES) cryptosystem, and public key cryptosystem, such as the Rivest Shamir Adleman (RSA) cryptosystem, for performing digital encryption on a given portion. Hereinafter, the digital encryption processing method is referred to as a digital encryption technology.

SUMMARY

It is an aspect of the embodiments discussed herein to provide image verification.

The above aspect can be attained by a system registering, as original image data, image data of an original scanned by a scanner; extracting, from the registered original image data, partial information regarding each part of information forming the original image data, generating a feature value of each piece of the partial information, generating signature information including a set of the feature values and a signature attached to the set of the feature values, and registering the signature information in association with the original image data; performing, a print encryption operation on a portion to be concealed and registering the partially print-encrypted original image data, and performing a digital encryption operation on the portion to be concealed and registering the digitally encrypted data, the print encryption operation allowing the original image to be yielded by decrypting a printed image of the print-encrypted original image data; providing, in response to a request for disclosing the encrypted original image data by printing, the encrypted original image data encrypted at the encryption operation as print data, and providing, in response to a request for disclosing the encrypted original image data by an electronic medium, at least the encrypted original image data.

Image data of an original scanned by a scanner may be registered as original image data.

Partial information regarding each part of information forming the original image data may be extracted from the original image data registered at the original registration operation. A feature value of each piece of the partial information may be generated. Signature information including a set of the feature values and a signature attached to the set of the feature values may be generated. The signature information may be registered in association with the original image data.

When at least part of the original image data is concealed, a print encryption operation is performed on a portion to be concealed and the partially print-encrypted original image data may be registered. A digital encryption operation may be performed on the portion to be concealed and the digitally encrypted data may be registered. Here, the print encryption operation allows the original image to be yielded by decrypting a printed image of the print-encrypted original image data.

In response to a request for disclosing the encrypted original image data by printing, the encrypted original image data may be provided as print data. In response to a request for disclosing the encrypted original image data by an electronic medium, at least the encrypted original image data may be provided as electronic medium data.

Furthermore, regarding an operation for verifying the encrypted original image data, the following operation is performed in response to a verification request involving decryption of the print data disclosed by the disclosure request by printing.

Image data obtained by scanning a paper medium containing a printed image of the print data by a scanner is acquired.

A portion corresponding to the encrypted concealed portion may be decrypted.

The decrypted image data is then provided. In response to a verification request not involving decryption of the electronic medium data of the encrypted original image data, partial information regarding each part of information forming the encrypted original image data may be extracted and a feature value of each piece of the partial information may be generated.

Furthermore, the generated feature values are compared with the respective feature values included in the signature information and the comparison results are provided. On the other hand, in response to a verification request involving decryption of the electronic medium data of the encrypted original image data, the digitally encrypted concealed portion of the encrypted original image data may be decrypted and the decrypted image data may be provided.

These together with other aspects and advantages which are subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIGS. 7A and 7B illustrate an embodiment;

FIG. 12 illustrates a paper disclosure operation and a signature verification operation;

FIGS. 13A and 13B illustrate a electronic disclosure operation and a signature verification operation;

DETAILED DESCRIPTION OF THE EMBODIMENTS

Figure 1:
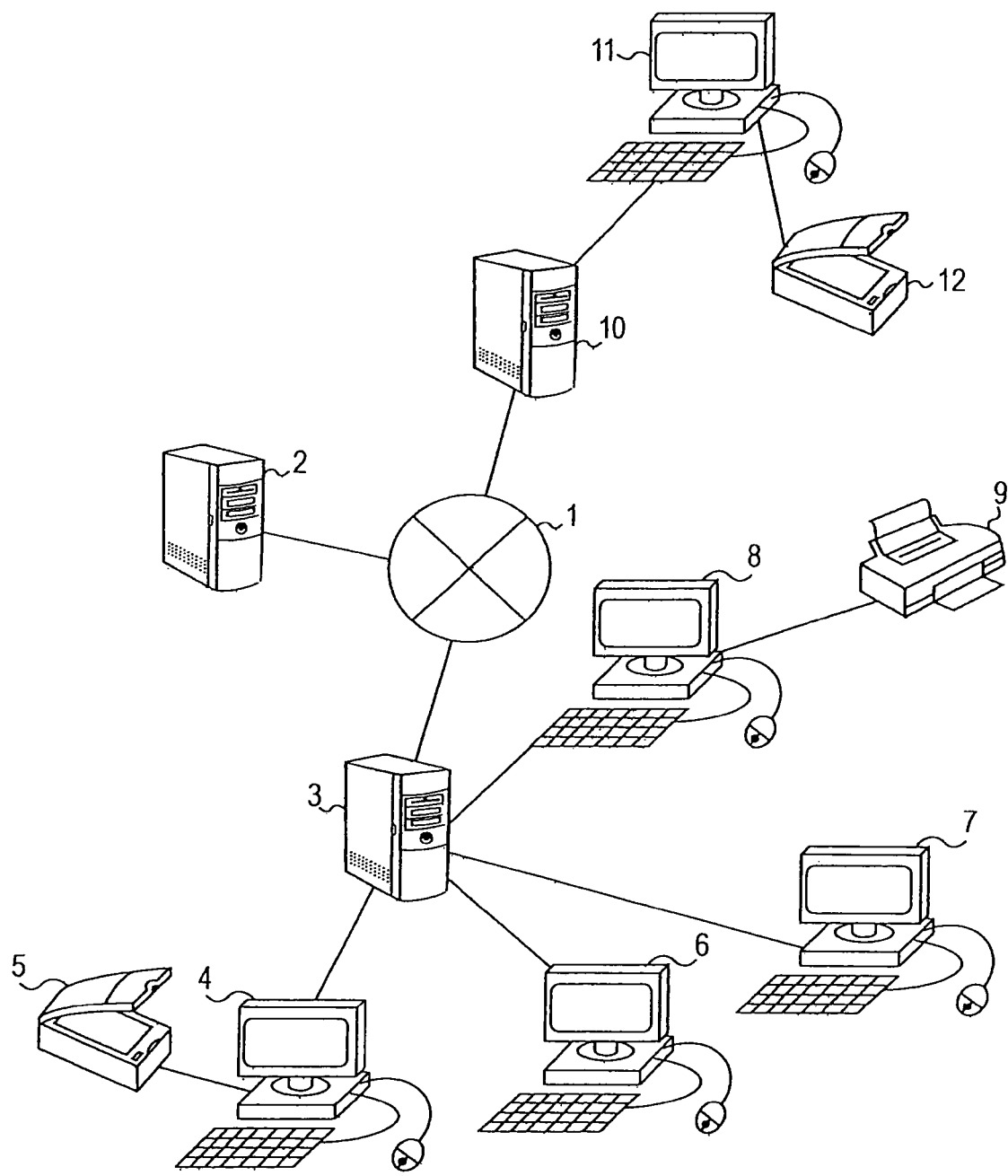
FIG. 1 illustrates an exemplary embodiment.

A system configuration according to an exemplary embodiment is described using FIG. 1.

Referring to FIG. 1, a network 1 may correspond to any kind of communication network, such as the Internet, an intranet, and a wide area network (WAN). A certification authority server 2 manages digital signature information. In the digital signature technology, signature information, which is information of a summary (message digest) of signature-attachment-target information encrypted with a secret key of a transmitting person, the signature-attachment-target information, and a public key certificate are transmitted to a receiving person. After confirming the validity of the public key certificate, the receiving person decrypts the encrypted signature information using a public key included in the public key certificate and compares the decrypted result with summary information obtained from the signature-attachment-target information. The receiving person may determine whether the information may be transmitted from a valid transmitting person or not according to whether this comparison result indicates agreement of the information.

Figure 2:
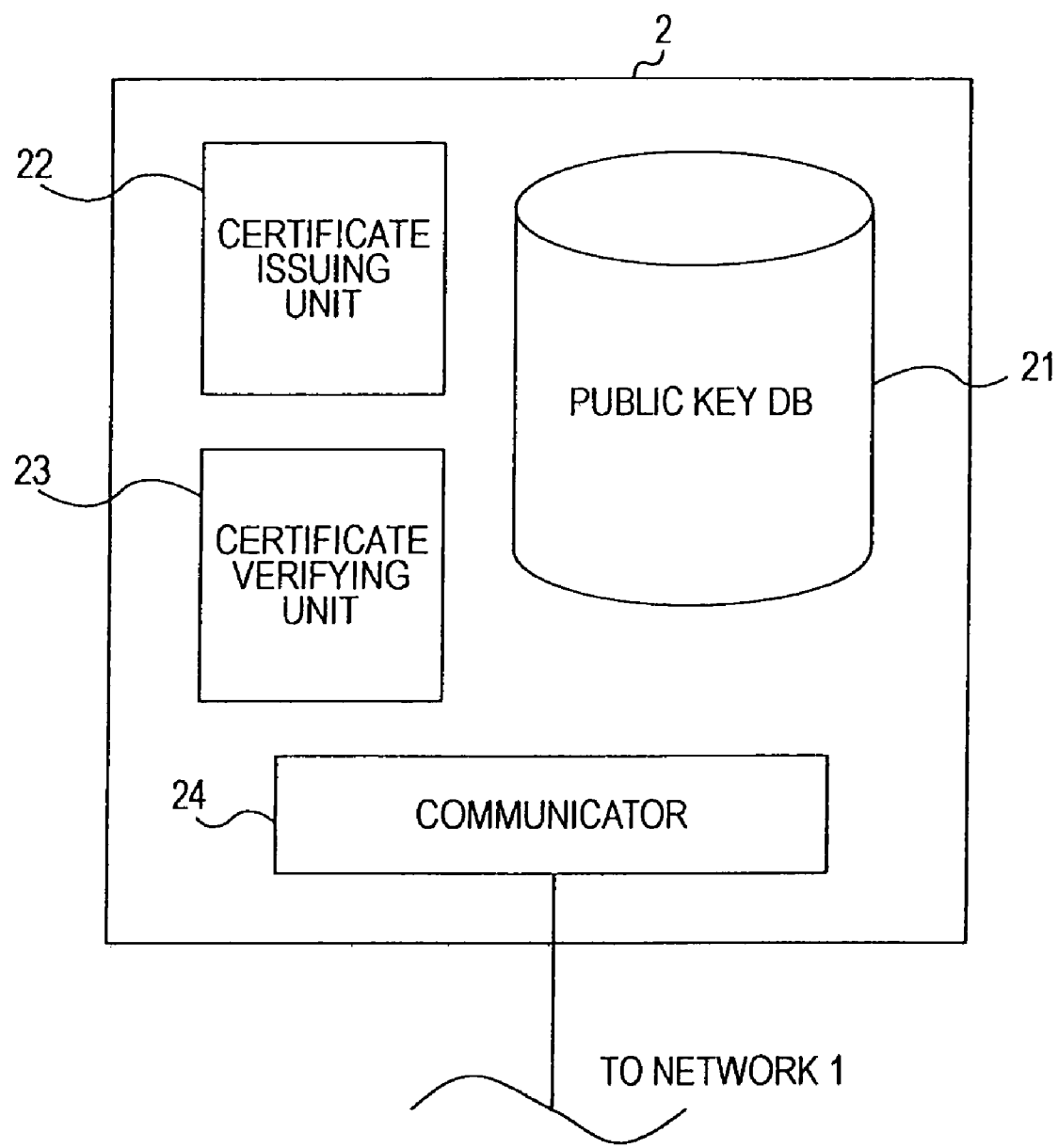
FIG. 2 illustrates an exemplary certification authority server.

Since this technology requires assurance of the validity of the certificate, the certification authority server 2 for storing public keys of signing people is generally provided as is seen in exemplary embodiment. As illustrated in FIG. 2, this certification authority server 2 includes a public key database (DB) 21 for storing public keys of signing people, a certificate issuing unit 22 for issuing a public key certificate in response to a request, a certificate verifying unit 23 for verifying a public key certificate, and communicator 24 for performing communication via the network 1.

Figure 3:
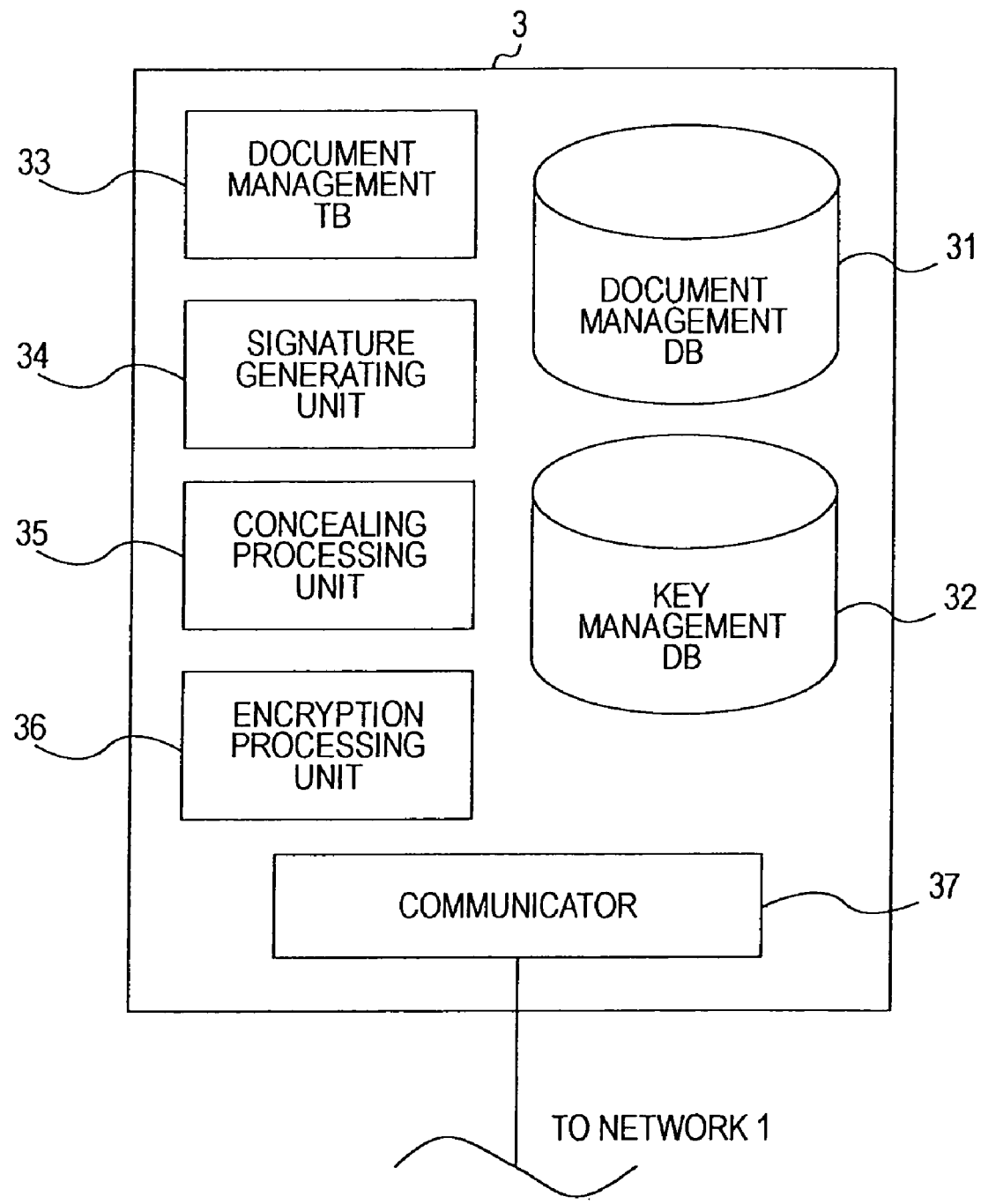
FIG. 3 illustrates an exemplary document management server (signature side)

A signing person, a concealing person, and a disclosing person operate a document management server 3. As illustrated in FIG. 3, this document management server 3 includes a document management DB 31 for storing information transmitted to a verification-side document management server 10 to be described later, a key management DB 32 for storing keys used by the concealing person in an encryption operation, a document management TB 33 for performing access control to the document management DB 31, a signature generating unit 34 for attaching PIAT signature information of a signing person and a digital signature to information, a concealing processing unit 35 for processing a concealed portion selected by the concealing person, an encryption processing unit 36 for performing an encryption operation using an encryption key stored in the key management DB 32, and communicator 37 for performing communication via the network 1.

A terminal of a scanning person (hereinafter, referred to as a scanning person's terminal) 4 may be used by the scanning person to operate a scanner 5 described later and to operate the document management server 3. This scanning person's terminal 4 can communicate with the document management server 3.

The scanner 5 may be used by the scanning person to scan a paper document to obtain an electronic document. This scanner 5 is connected to the scanning person's terminal 4.

A terminal of a signing person (hereinafter, referred to as a signing person's terminal) 6 may be used by the signing person to operate the document management server 3. This signing person's terminal 6 can communicate with the document management server 3.

A terminal of a concealing person (hereinafter, referred to as a concealing person's terminal) 7 may be used by the concealing person to operate the document management server 3. This concealing person's terminal 7 can communicate with the document management server 3.

A terminal of a disclosing person (hereinafter, referred to as a disclosing person's terminal) 8 may be used by the disclosing person to operate a printer 9 to be described later and to operate the document management server 3. This disclosing person's terminal 8 can communicate with the document management server 3.

The printer 9 may be used by the disclosing person to print/output an electronic document as a paper document. This printer 9 is connected to the disclosing person's terminal 8.

Figure 4:
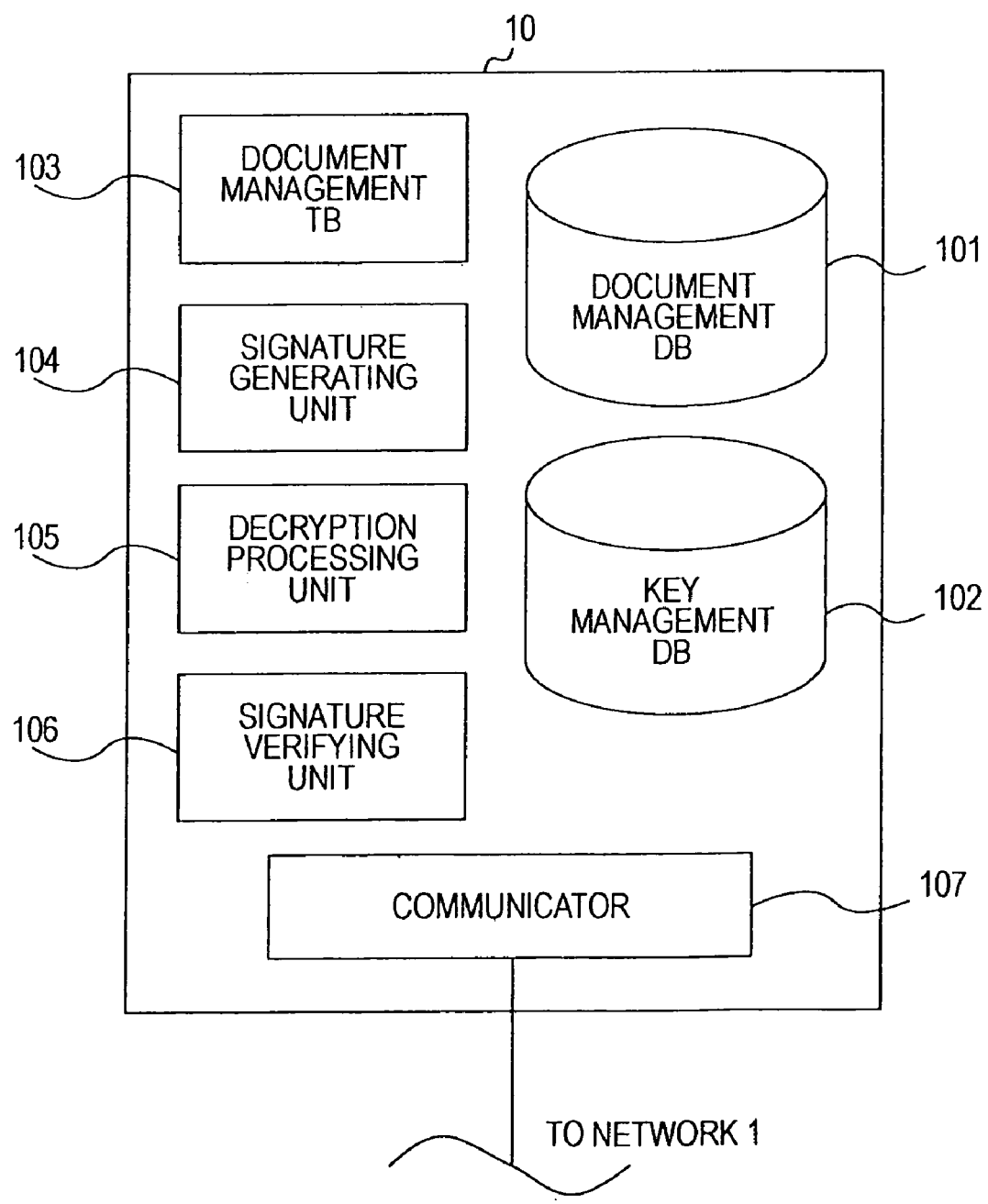
FIG. 4 illustrates an exemplary document management server (verification side)

A browsing person and a verifying person operate the document management server 10. As illustrated in FIG. 4, this document management server 10 includes a document management DB 101 for storing information transmitted from the signature-attachment-side document management server 3, a key management DB 102 for storing keys used by a verifying person in a decryption operation, a document management TB 103 for performing access control to the document management DB 101, a signature generating unit 104 for generating PIAT signature information of a signing person regarding the information, a decryption processing unit 105 for performing a decryption operation using a decryption key stored in the key management DB 102, a signature verifying unit 106 for verifying a digital signature attached to transmitted information, and communicator 107 for performing communication via the network 1.

A terminal of a browsing/verifying person (hereinafter, referred to as a browsing/verifying person's terminal) 11 may be used by the verifying person to operate a scanner 12 described later and by the browsing person and the verifying person to operate the document management server 10. This browsing/verifying person's terminal 11 can communicate with the document management server 10.

The verifying person scans a paper document with the scanner 12 to obtain an electronic document. This scanner 12 is connected to the browsing/verifying person's terminal 11.

Example operations of a system is described below. First, a digital signature generating operation of a device according to an embodiment is described.

In the digital signature technology, a transmitting person previously generates a pair of keys (namely, a secret key and a public key) and transmits the public key to the certification authority server 2 to cause the certification authority server 2 to issue a public key certificate. The secret key and the public key certificate are stored in a transmission device. Before the transmission device transmits the information, summary information (message digest) of signature-attachment-target information may be generated and encrypted with the secret key of the transmitting person. The encrypted summary information is called signature information.

The transmitting person then transmits the signature-attachment-target information, the signature information, and the public key certificate of the transmitting person to a partner. Upon receiving those kind of information, the partner (a receiving person) checks the validity of the transmitting person's public key certificate acquired from the certification authority server 2. If the certificate is valid, the receiving person decrypts the signature information using the public key. The receiving person then generates a summary of the signature-attachment-target information and compares the generated summary with the decrypted information. If the generated summary matches the decrypted information, it is proven that the information may be transmitted from a valid transmitting person and is not tampered.

Herein, the summary information is information (hash information) calculated using a cryptographic one-way hush function on the signature-attachment-target information. Since the size of the signature-attachment-target information can be compressed, the summary information may be referred to as a message digest.

In addition, the hash information generated using the cryptographic one-way hush function is unique information that can be generated only from the signature-attachment-target information and the original information is not restored from the generated hush information. Accordingly, the hush information is commonly used in encryption of information and generation of a digital signature.

Algorithms, such as MD5, SHA-1, and SHA-256, are available as this cryptographic one-way hush function. The public key certificate includes information regarding an algorithm (hash information generating algorithm) applied to information to generate the summary information (hash information).

An exemplary digital signature generating operation is described below.

Figure 5:
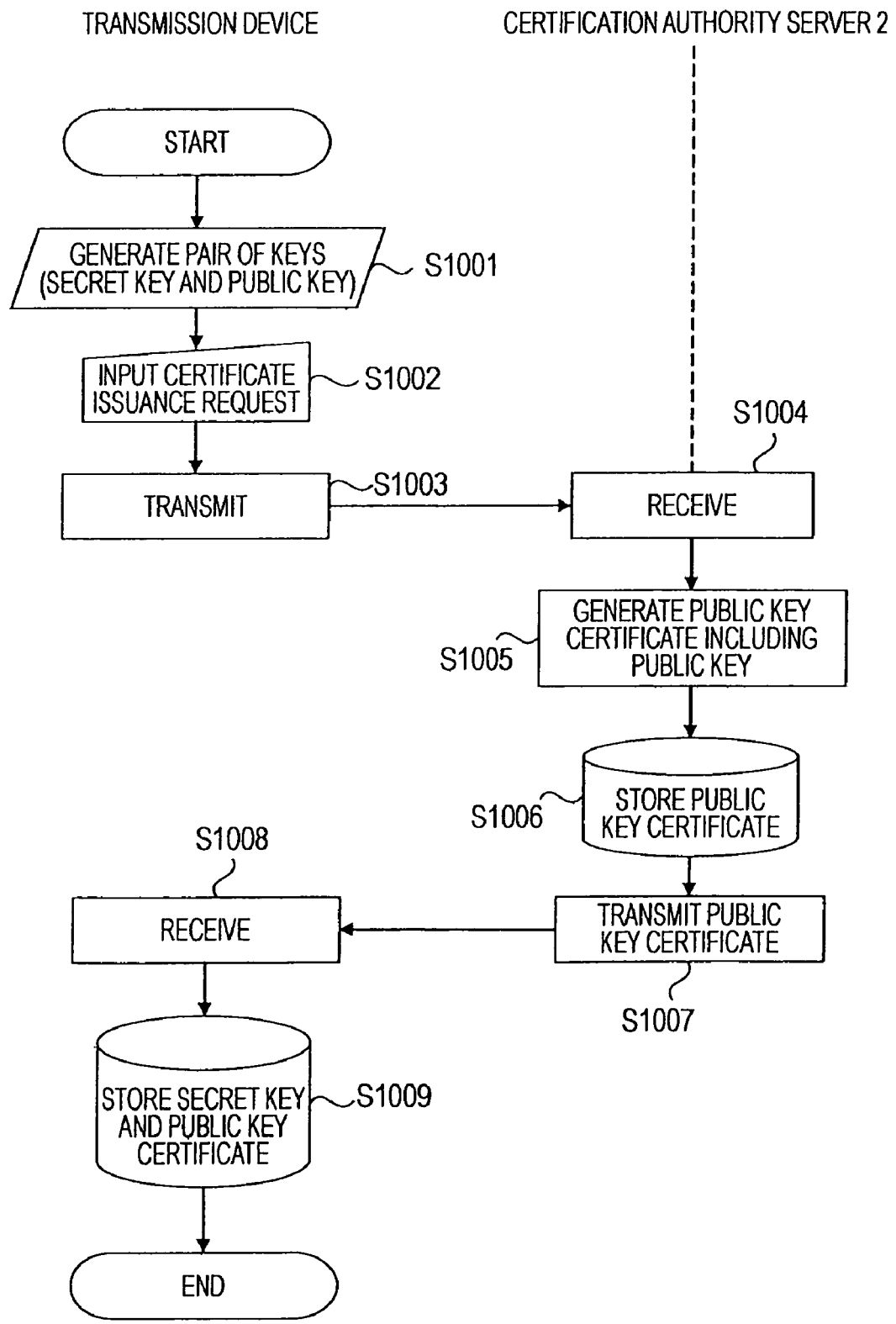
FIG. 5 illustrates a public key registration operation performed by a transmission device and a certification authority server.

A public key registering operation performed in a transmission device and the certification authority server 2 is described using a flowchart illustrated in FIG. 5. Meanwhile, the document management server 3 serves as a digital signature transmission device in the embodiment illustrated in FIG. 1.

A transmitting person generates a pair of keys (namely, a secret key and a public key) (S1001). In response to the transmitting person's operation of the transmission device to input certificate issuance request information (S1002), the transmission device transmits the input certificate issuance request information and the public key to the certification authority server 2 (S1003).

Upon the communicator 24 receiving this information (S1004), the certificate issuing unit 22 of the certification authority server 2 generates a public key certificate including the public key (S1005) and stores the generated public key certificate in the public key DB 21 (S1006).

The certificate issuing unit 22 then controls the communicator 24 to transmit the issued public key certificate to the transmission device having transmitted the certificate issuance request information via the network 1 (S1007).

Upon receiving this information (S1008), the transmission device stores the secret key generated at S1001 and the public key certificate issued by the certification authority server 2 in a storage device (a storage area included in the signature generating unit 34 of the document management server 3) included therein (S1009) and terminates the operation.

Figure 6:
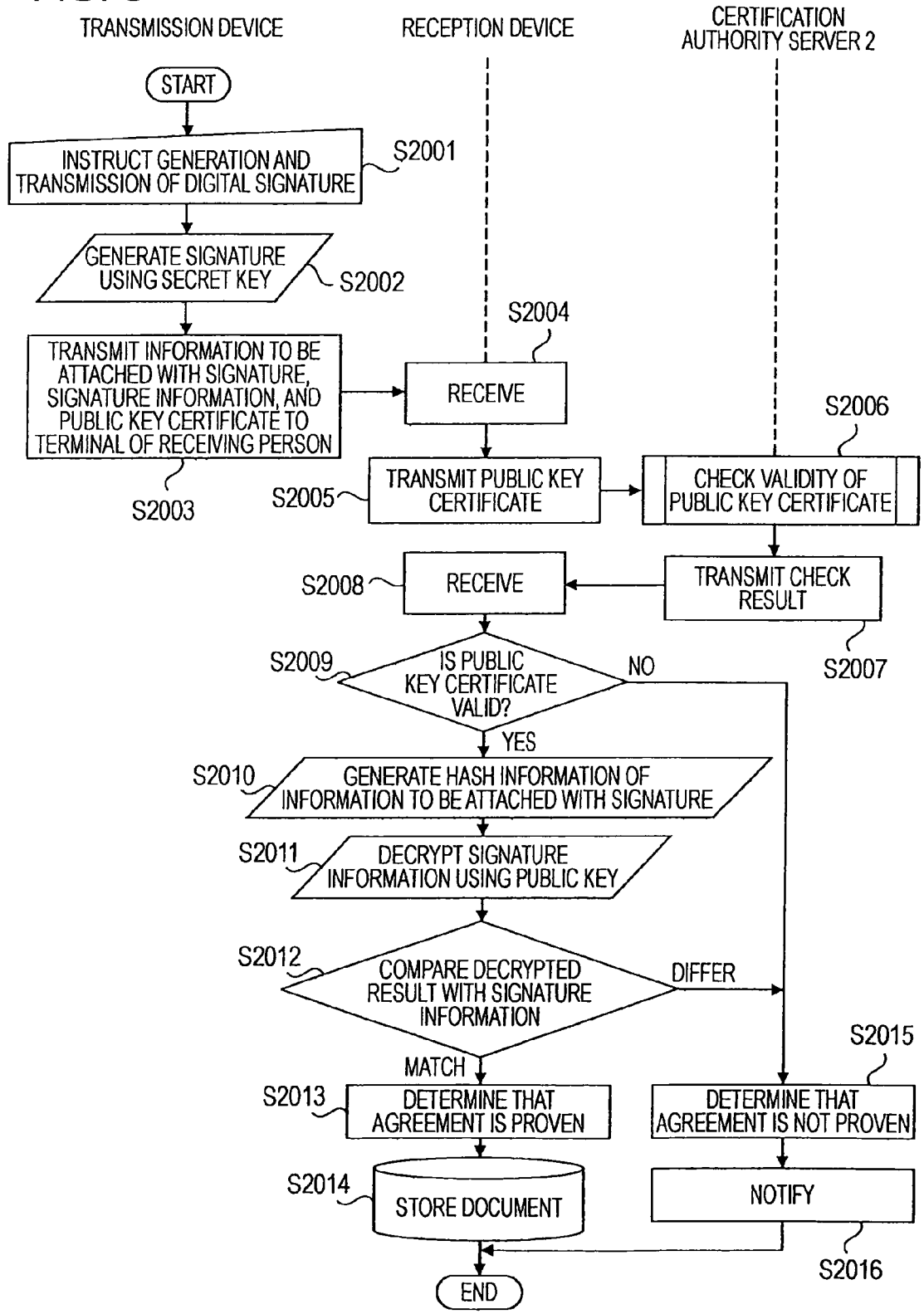
FIG. 6 illustrates a transmission/reception operation of digital-signature-attached information and a verification operation of a reception device.

A transmission/reception operation of digital-signature-attached information and a verification operation of a reception device will now be described using a flowchart illustrated in FIG. 6.

In response to a transmitting person's input of an instruction for generating a digital signature of given signature-attachment-target information and for transmitting the digital signature to the reception device (S2001), a transmitting device encrypts summary information (hash information) of the specified signature-attachment-target information using a secret key stored in a storage area (S2002) and transmits the encrypted summary information and the stored public key certificate to the reception device (S2003).

Upon receiving these pieces of information (S2004), the reception device transmits the public key certificate to the certification authority server 2 to check the expiration date and the invalidity information of the transmitted public key certificate (S2005).

Here, it is assumed that the certification authority server 2 supports a series of functions for issuing and verifying the certificate. The certification authority server 2 checks the validity of the received public key certificate (S2006) and transmits the result to the reception device (S2007).

The reception device then receives the validity check result (S2008). Upon receiving the validity check result, the reception device may determine whether the certificate is valid (S2009). After confirming the validity of the certificate, the reception device generates hush information from the signature-attachment-target information received from the transmission device with reference to the hash information generating algorithm included in the public key certificate of the transmitting person acquired from the transmission device (S2010).

The reception device then decrypts the signature information received from the transmission device using the public key included in the public key certificate (S2011). The reception device compares the hash information generated at S2010 with information resulting from the decryption performed at S2011 to determine whether the hash information matches the decrypted result (S2012). Upon determining the hash information matches the decrypted result (S2013), the reception device stores those pieces of information (S2014).

On the other hand, if the hash information differs from the decrypted result (S2015), the reception device notifies an operator of the reception device of a message indicating that the validity is not proven (S2016). If the validity of the public key certificate cannot be confirmed at S2009, the reception device may determine that the certificate is not proven as a certificate transmitted from the transmission device (the transmitting person) (S2015) and notifies the operator of the reception device of a message indicating the validity is not proven (S2016).

An exemplary method for applying the PIAT to JPEG-format image data is described. Hereinafter, the method for applying the PIAT to the JPEG-format image data is abbreviated as a JPEG-PIAT method.

Electronic data resulting from scanning is often converted into an image in a compressed format, such as JPEG. When a technology for guaranteeing partial integrity is applied to this electronic data, the format has to be analyzed after compression and decompression of the image data.

Since processing is performed after dividing a bitmap image into rectangles in the JPEG, this divided rectangle can be considered as a unit of a "part". However, since entropy compression is performed on a plurality of these blocks to hold the data in the JPEG format, the simple application of the PIAT is not employable.

To attempt to solve this problem, conventionally a method applies the PIAT to entropy-compressed/decompressed image data of the JPEG format.

There are various JPEG compression methods and formats. In exemplary embodiment, for simplification of the description, a JPEG file interchange format (JFIF) using a basic discrete cosine transform (DCT) is employed, an aspect ratio and a sampling factor of luminance to color difference are fixed to 2:1, the restart interval is disabled, and a thumbnail unused data format is utilized. Hereinafter, a target format is simply referred to as JPEG.

Figure 14:
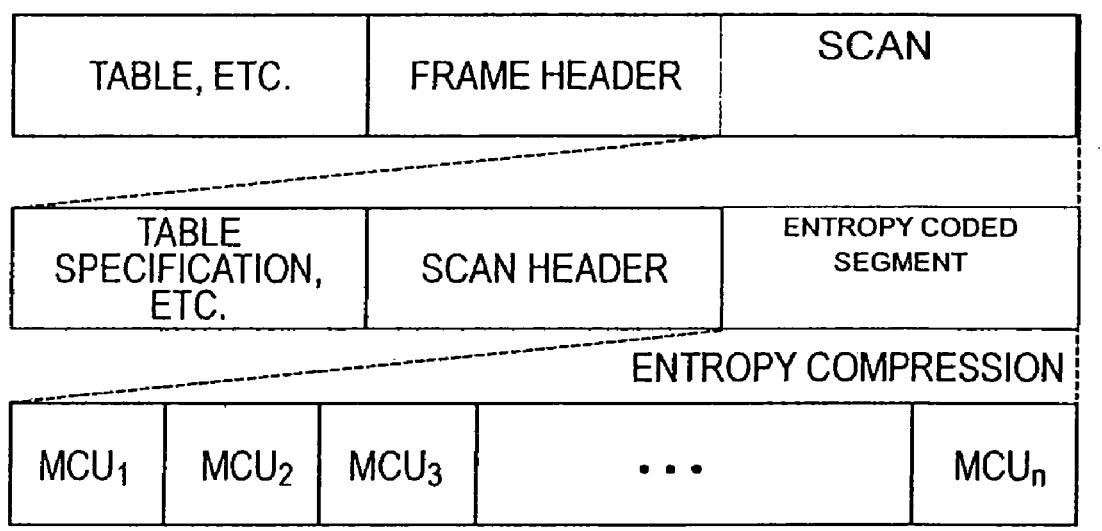
FIG. 14 illustrates a structure of joint picture expert group (JPEG) data.
Figure 15:
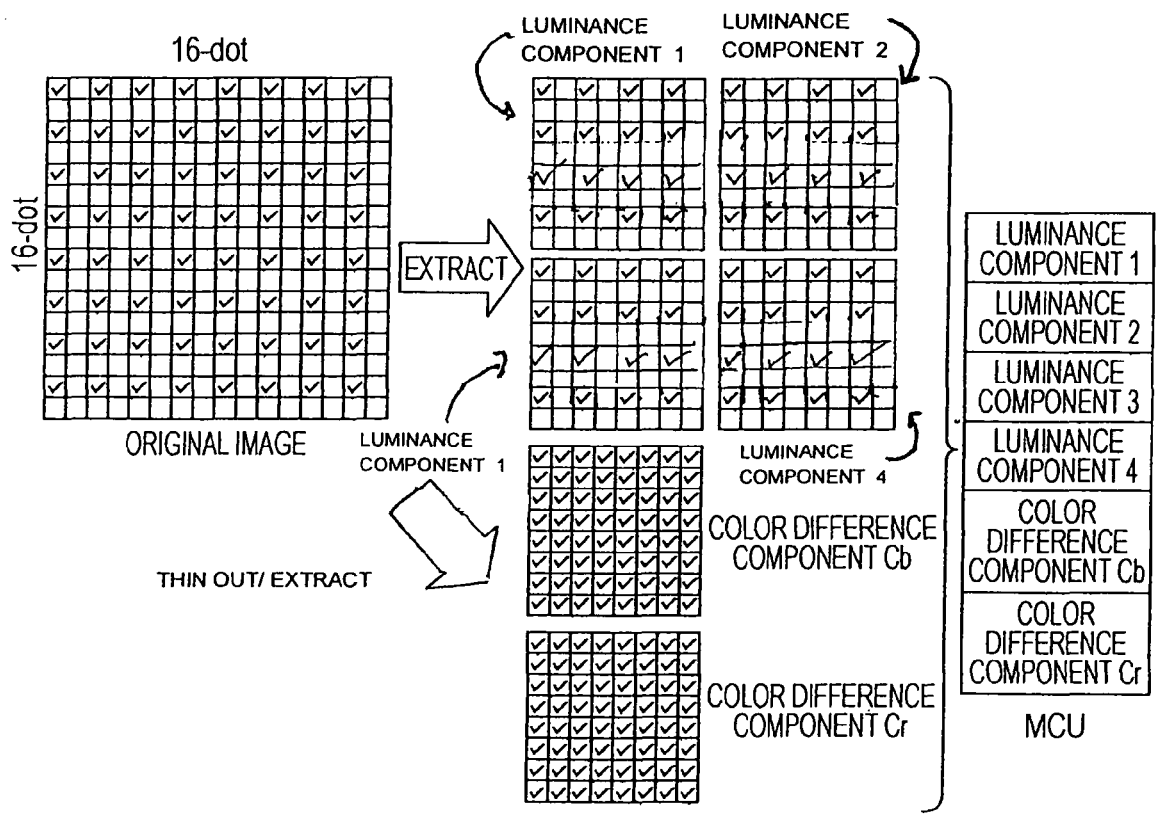
FIG. 15 illustrates a relation between a minimum coded unit (MCU) format and an image.

FIG. 14 illustrates a structure of JPEG data. Referring to FIG. 14, a minimum coded unit (MCU) may correspond to one block of an image. FIG. 15 illustrates a relation between an MCU format and an image. Referring to FIG. 15, 16×16 dots of an image constitute one MCU, which includes six 8×8-dot luminance and color difference components. This is because the size of data is compressed by thinning out the color difference components.

Figure 16:
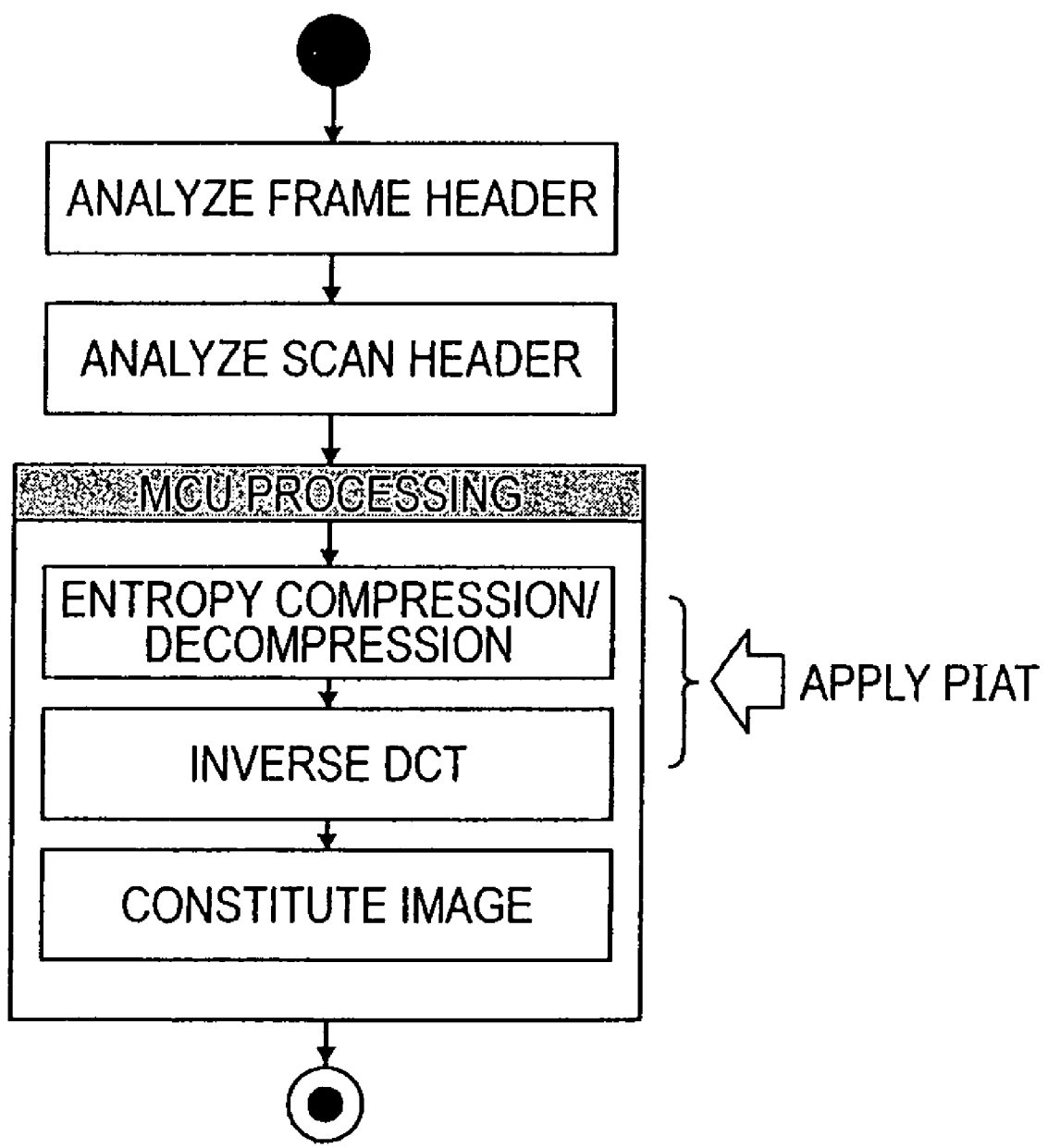
FIG. 16 illustrates a JPEG decoding process.
Figure 17:
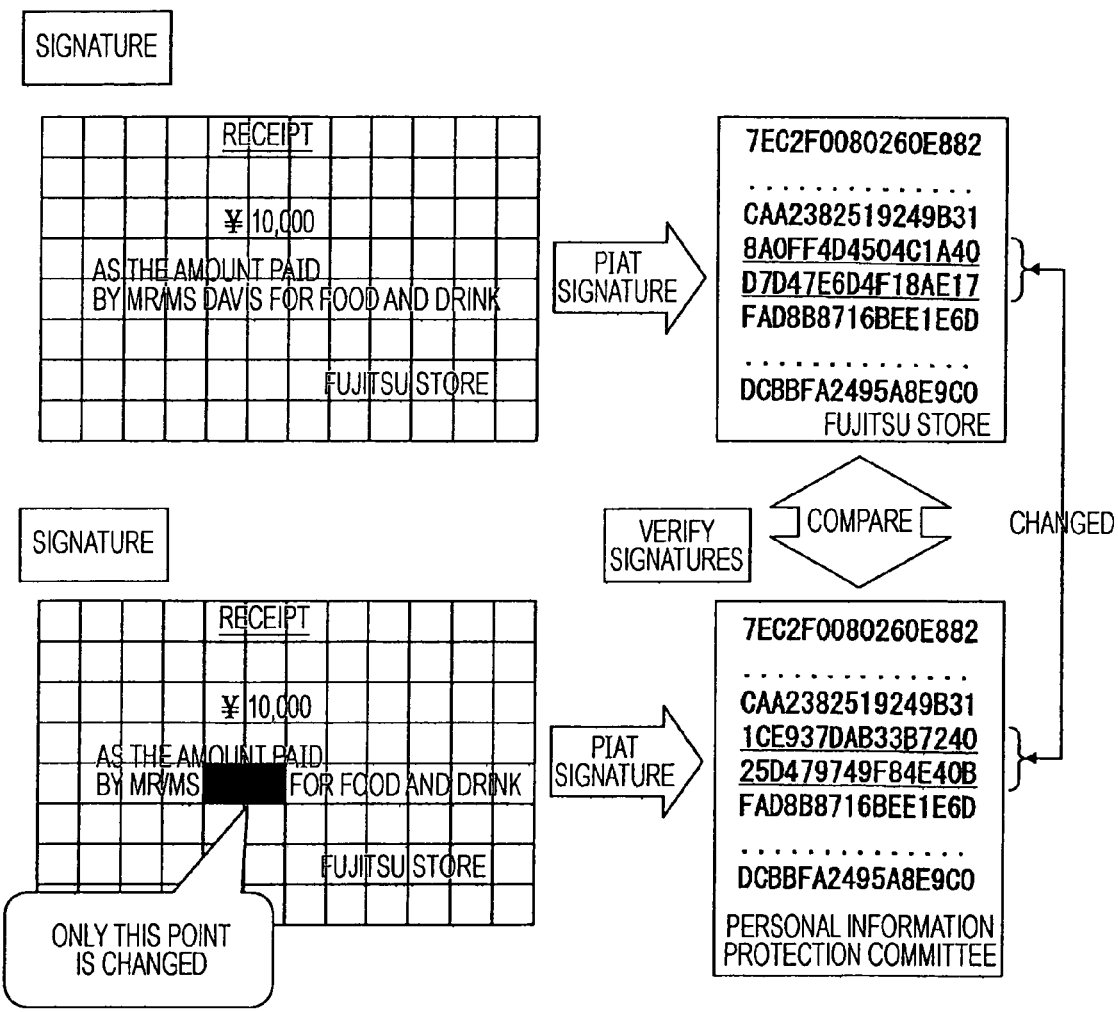
FIG. 17 illustrates a JPEG-PIAT method.

FIG. 16 illustrates a JPEG decoding process. As illustrated in FIG. 14, JPEG data includes a plurality of entropy-compressed MCUs. Accordingly, to guarantee the integrity for each MCU or each luminance or color difference component, the PIAT is applied after the entropy compression/decompression as illustrated in FIG. 16. An example of a JPEG-PIAT method is illustrated below (see FIG. 17). Referring to FIG. 17, PIAT signature information may be generated for an unconcealed original and for a concealed (modified) original. Hash values of both of the pieces of PIAT signature information are compared with each other to identify changes.

At the time of attachment of a signature, a JPEG file is treated as a first version of image data. The entropy compression/decompression is performed on this first version of image data to extract luminance and color difference components. Hush information is then calculated for each component, a digital signature is attached to those kind of hush information, and the digital-signature-attached hush information is stored in another file (more specifically, partial information regarding each part of information of original image data may be extracted, a feature value of each piece of the partial information may be generated, and a set of the feature values attached with a digital signature is stored). The stored information is referred to as a first version of PIAT signature information. The first version of image data is stored in association with the first version of PIAT signature information.

At the time of modification/sanitization, a given part of the first version of image data is modified/sanitized with an image editor or the like. This modified/sanitized image data is referred to as a second version of image data. In processing similar to that performed at the time of signature attachment, a second version of PIAT signature information may be generated. The second version of image data, the second version of PIAT signature information, and the first version of PIAT signature information are disclosed.

At the time of verification of a signature, digital signatures of the first and second versions of the PIAT signature information are checked first.

Whether hush information generated from the second version of image data in the processing similar to that performed at the time of signature attachment matches hush information of the second version of PIAT signature information is determined (verification of the second version of PIAT signature information).

Furthermore, the first and second versions of PIAT signature information are compared with each other to identify the modified/sanitized part. In this manner, the modified/sanitized part in the second version can be identified without disclosing the first version of image data.

Entities used in the embodiment and a role of each entity are now defined. In the embodiment, six entities, namely, a scanning person, a signing person, a concealing person, a disclosing person, a browsing person, and a verifying person, are used.

The scanning person scans a signature-attachment-target paper document using the scanner 5 to digitalize the document and stores the document as original image data.

The signing person attaches PIAT signature information (with a digital signature) to the original image data scanned by the scanning person and stores the original image data as signature-attached original image data.

The concealing person partially conceals and encrypts a rectangle selected portion of the original image data scanned by the scanning person, and stores the original image data as encrypted original image data. Although the signing person may perform this partial concealment operation, a person performing the partial concealment operation is separately set herein.

The disclosing person discloses the encrypted original image data, part of which is concealed by the concealing person, to the browsing person or the verifying person through both of or one of a paper medium and a electronic medium.

More specifically, in the disclosure through a paper medium, the disclosing person prints the encrypted original image data on a paper using the printer 9 and discloses the printed material to the browsing person or the verifying person. In addition, in the disclosure through an electronic medium, the disclosing person discloses the encrypted original image data to the browsing person or the verifying person using an online medium such as an email or a shared server or an offline medium such as a portable medium (an USB memory).

The browsing person browses the encrypted original image data disclosed by the disclosing person using both of or one of the paper medium and the electronic medium. However, herein, the browsing person is defined as a person that simply receives and browses the encrypted original image data disclosed by the disclosing person.

Some of the browsing persons may be verifying persons. The verifying persons may be classified into those having a right for decrypting the partially concealed part and those not having the decryption right. The former verifying persons receive a decryption key for use in the decryption from the concealing person in some way.

More specifically, in verification by a paper disclosure route, the browsing person checks the disclosed paper medium with their eyes. In addition, the verifying person having the decryption right digitalizes the disclosed paper medium using the scanner 12 and decrypts the output encrypted original image data.

Since the decrypted original image data, the concealed part of which may be decrypted, is displayed on a display device of the browsing/verifying person's terminal 11, the verifying person checks the displayed content with their eyes. Additionally, since the verifying person not having the decryption right cannot decrypt the partially concealed part, the verifying person checks whether the content of the disclosed paper medium checked with their eyes matches the displayed content.

In verification by an electronic disclosure route, the browsing person checks the disclosed encrypted original image data through a display device of the browsing/verifying person's terminal 11. In addition, the verifying person having the decryption right decrypts the partially concealed part to restore the content and confirms that the decrypted result matches the original image data. Additionally, the verifying person not having the decryption right performs verification of the decrypted original image data, part of which is concealed, to confirm the modified portion and the integrity of the disclosed portion.

Figure 7B:
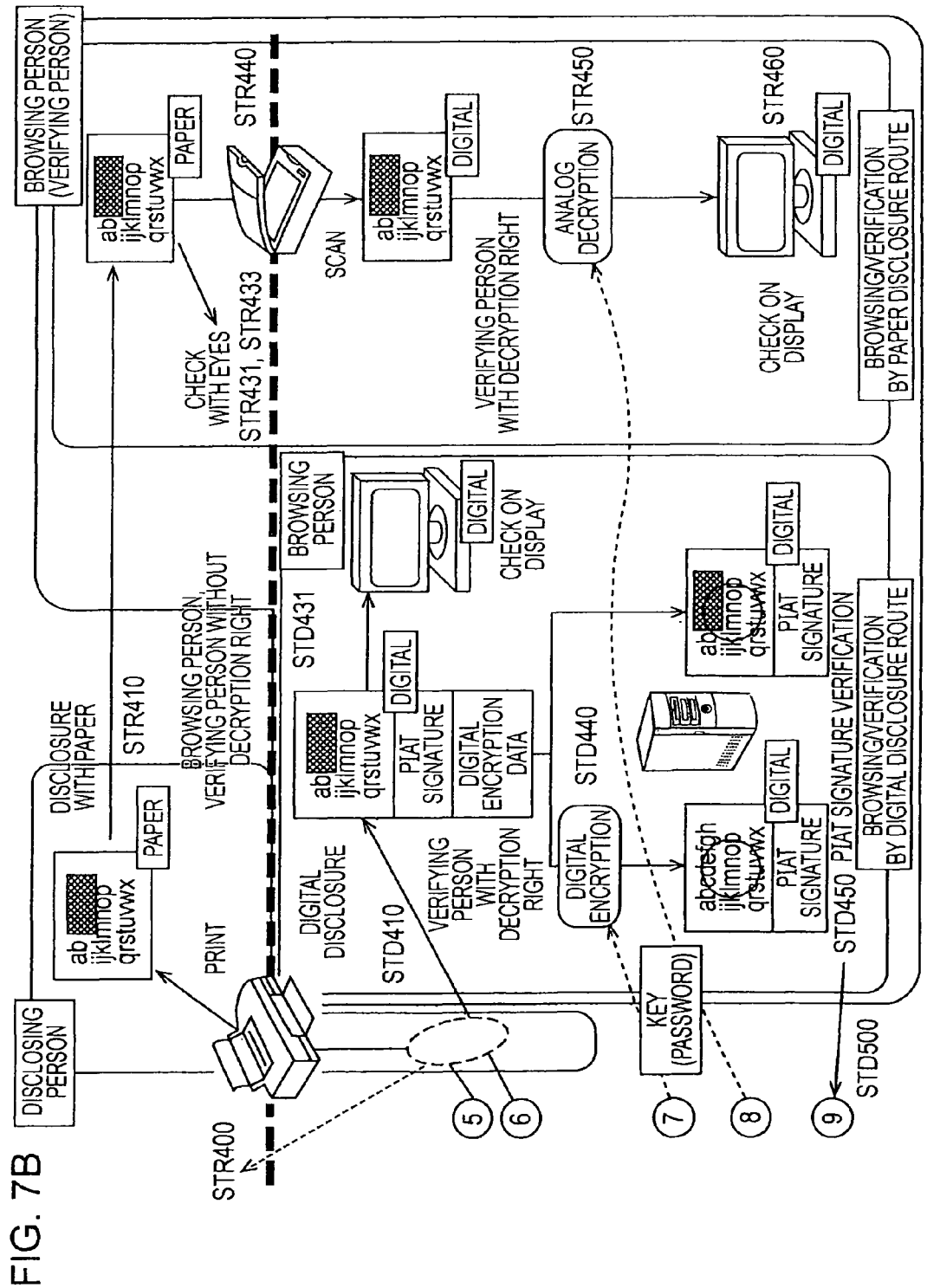
Figure 8:
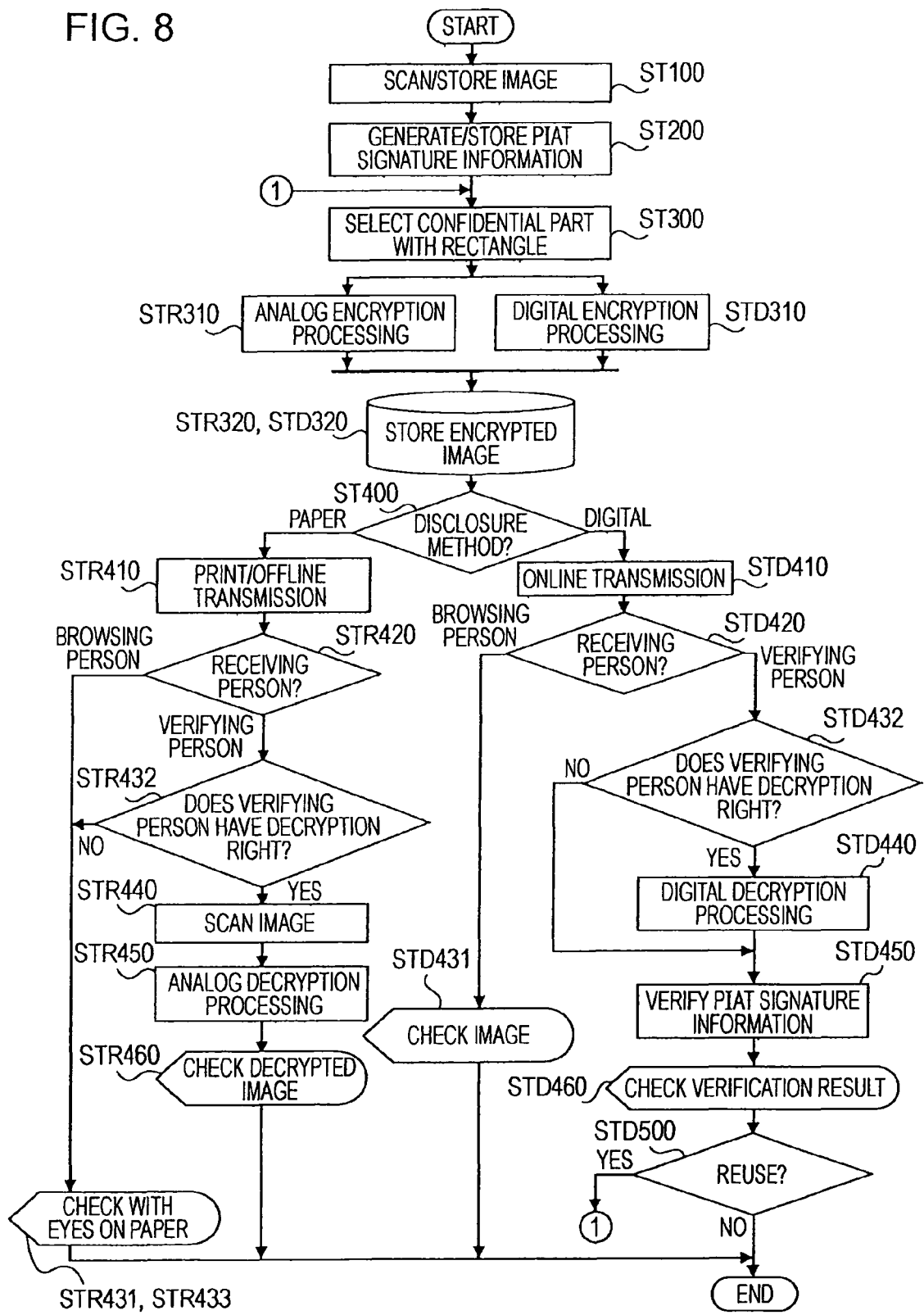
FIG. 8 illustrates an operation of an embodiment.
Figure 9:
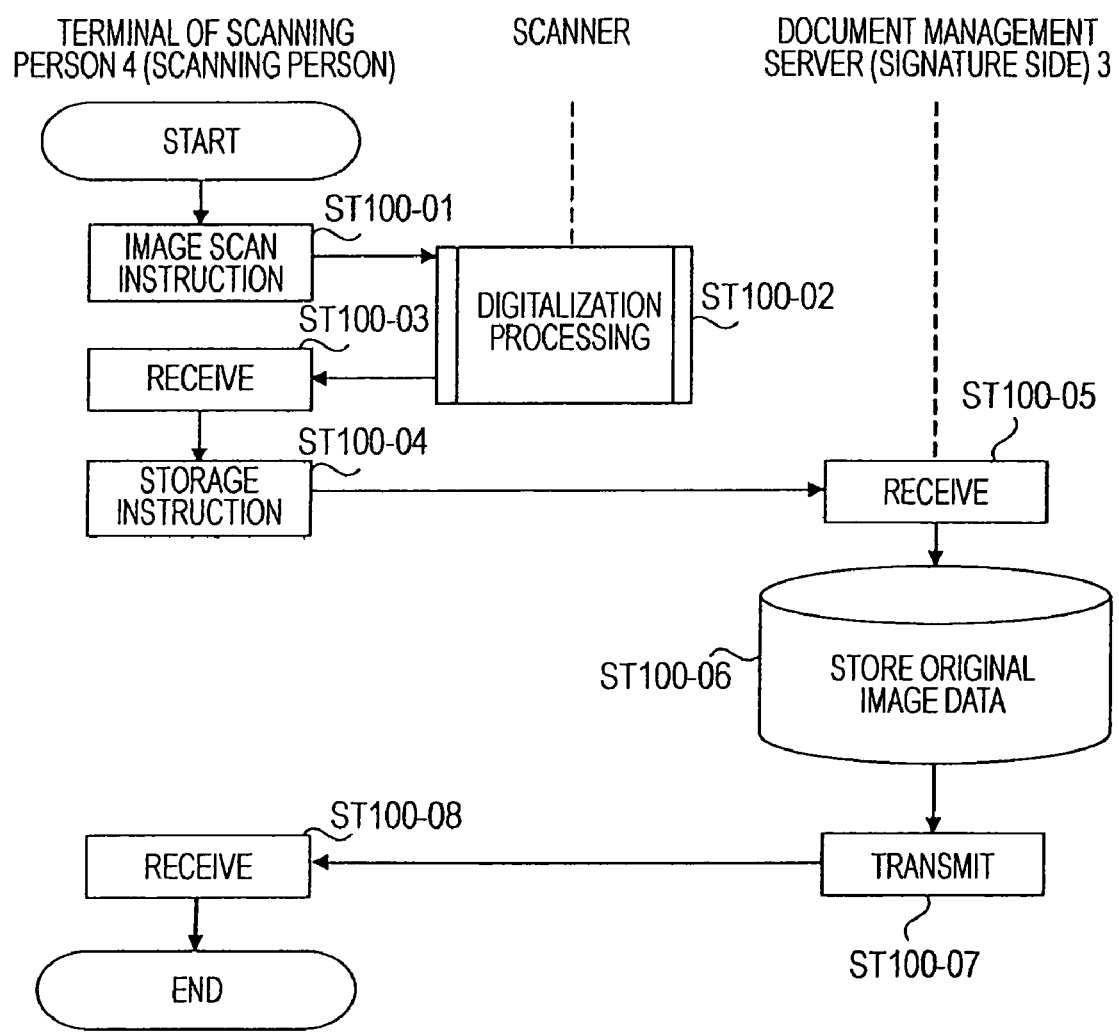
FIG. 9 illustrates a scanning operation of a scanner.
Figure 10:
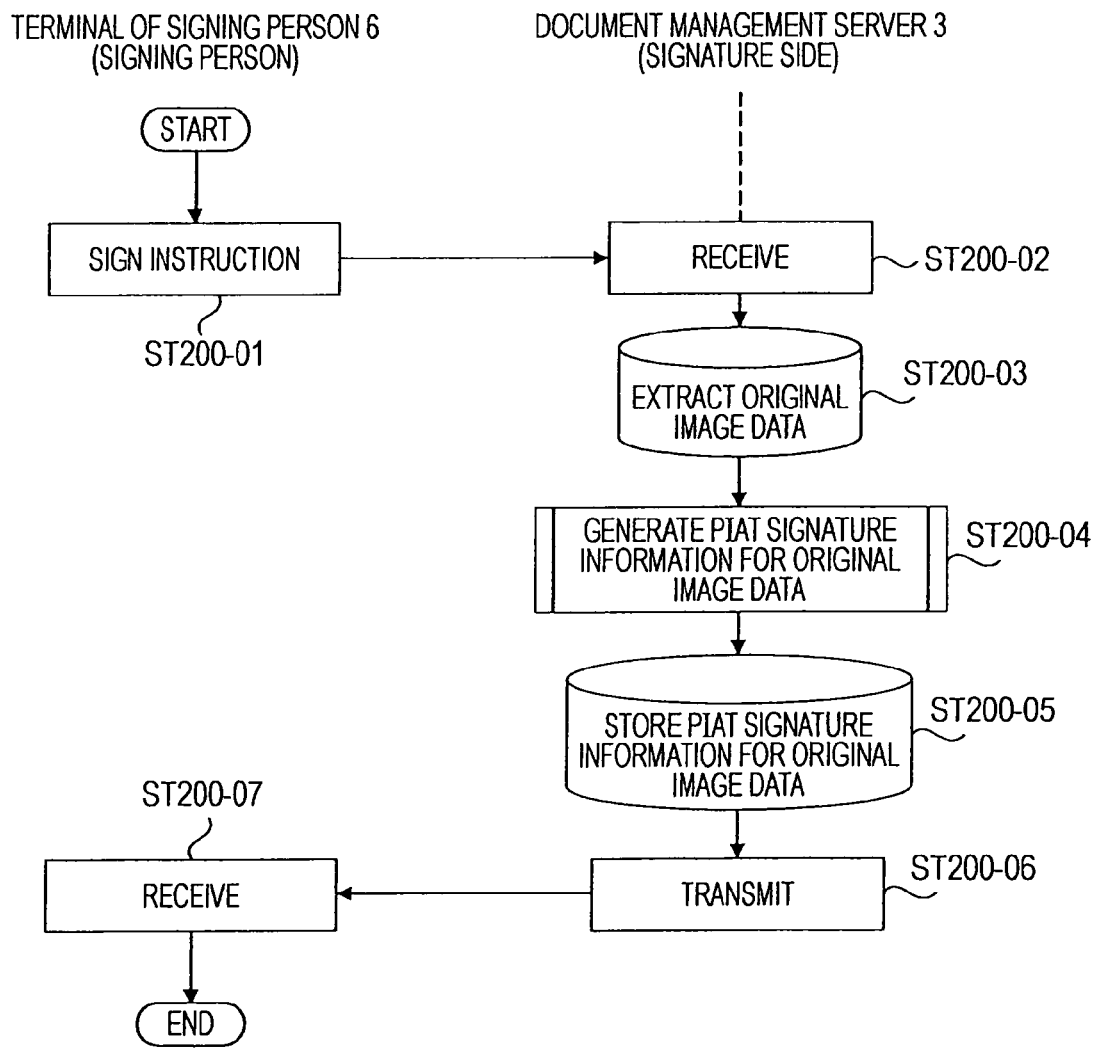
FIG. 10 illustrates a signature generating operation.
Figure 11:
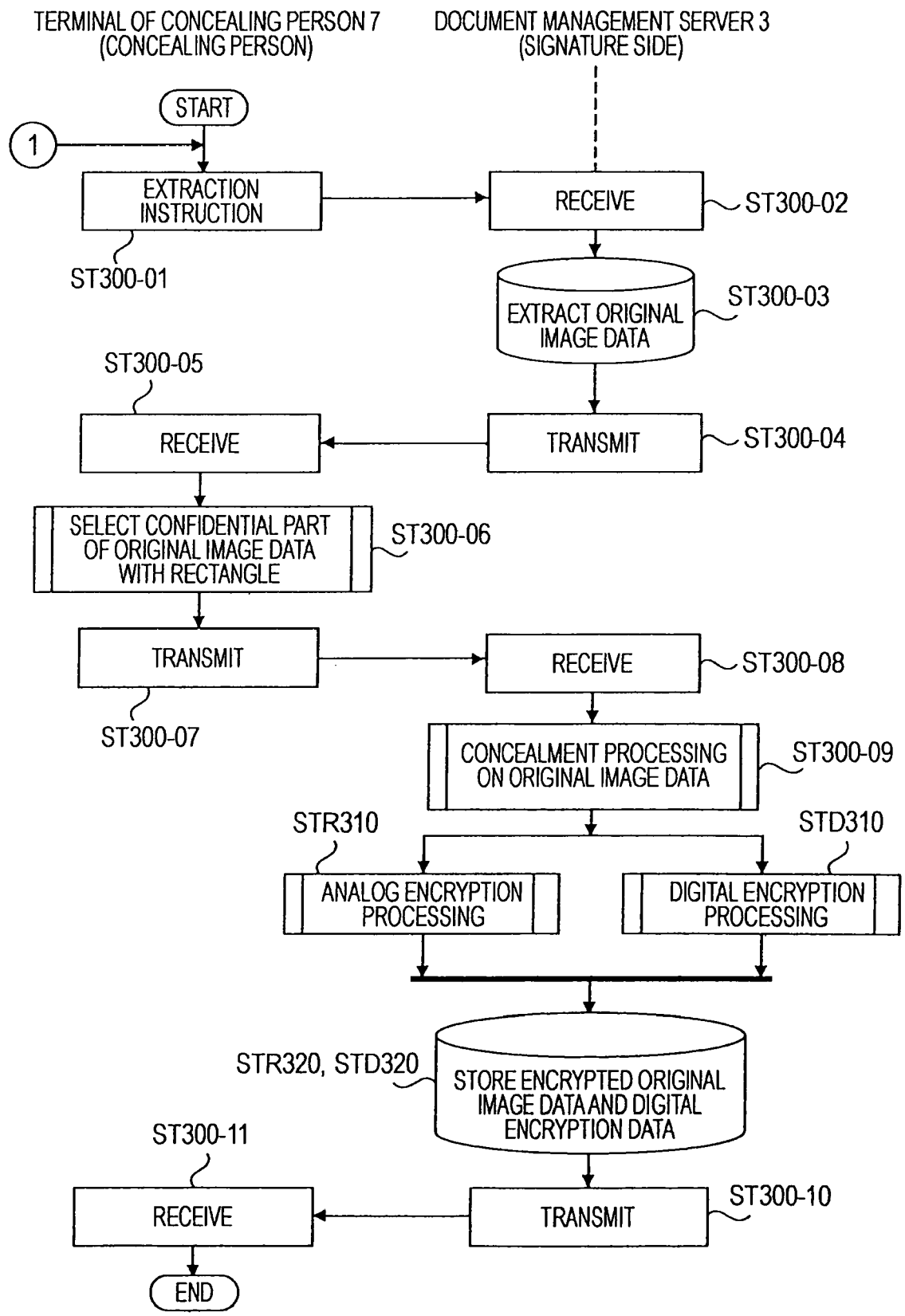
FIG. 11 illustrates a concealing operation.
Figure 13A:
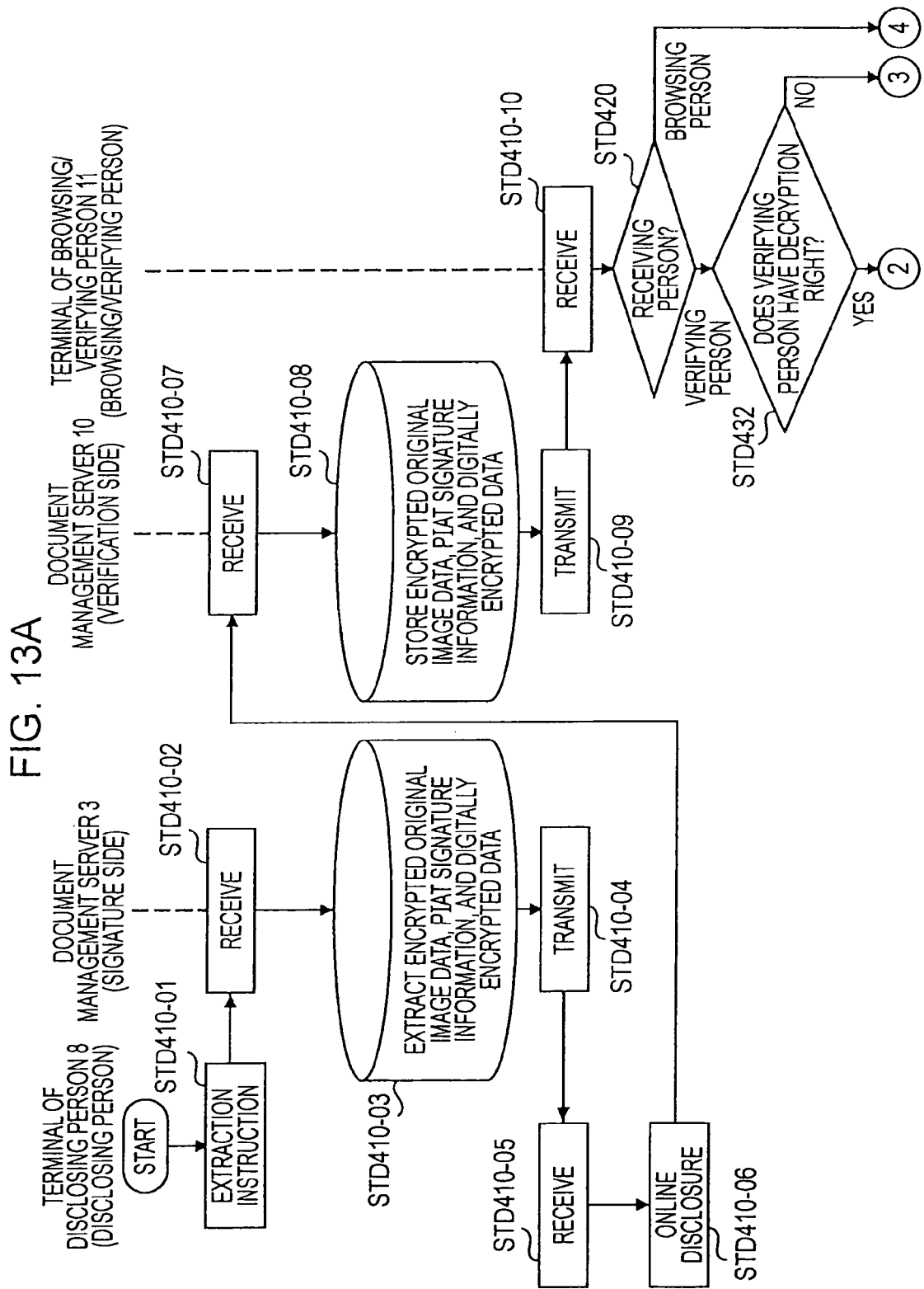

FIGS. 7A and 7B illustrate an embodiment. Specific operations are described below along operations illustrated in FIGS. 7A and 7B, an overall flowchart according to an embodiment illustrated in FIG. 8, and flowcharts illustrated in FIGS. 9 to 13B. Similar operations are illustrated in FIGS. 7A to 8 labeled accordingly. Operations illustrated in FIGS. 7A to 8 are illustrated in further detail in FIGS. 9 to 13B.

The scanning person issues an instruction for scanning a paper document subjected to a signature-attachment and partial-concealment operation that is set in the scanner 5 using the scanning person's terminal 4 (ST100-01).

In response to reception of the image scan instruction from the scanning person's terminal 4, the scanner 5 scans and digitalizes the paper document. The scanned original image data is converted into the JPEG format (ST100-02).

The JPEG-format original image data is then transmitted to the scanning person's terminal 4 and is displayed on a display device included in the scanning person's terminal 4 (ST100-03). After the scanning person selects a storage function, the scanning person's terminal 4 transmits the scanned original image data to the document management server 3 (ST100-04).

The document management server 3 receives the original image data through the communicator 37 (ST100-05) and accumulates/stores the original image data in the document management DB 31 through the document management TB 33 (ST100-06). After the completion of the accumulation/storage, the document management server 3 transmits a completion notification to the scanning person's terminal 4 through the communicator 37 (ST100-07). After the scanning person's terminal 4 receives the completion notification (ST100-08), the scanning person confirms that there is no error and terminates the operation of ST100.

In response to a signature attachment instruction from the signing person (ST200-01), the signing person's terminal 6 accesses the document management server 3. The document management server 3 receives the signature attachment instruction through the communicator 37 (ST200-02). The document management server 3 extracts the original image data, scanned by the scanning person and accumulated/stored in the document management DB 31, from the document management DB 31 through the document management TB 33 (ST200-03).

The signature generating unit 34 generates PIAT signature information for the original image data using the above-described JPEG-PIAT method (ST200-04).

Figure 18:
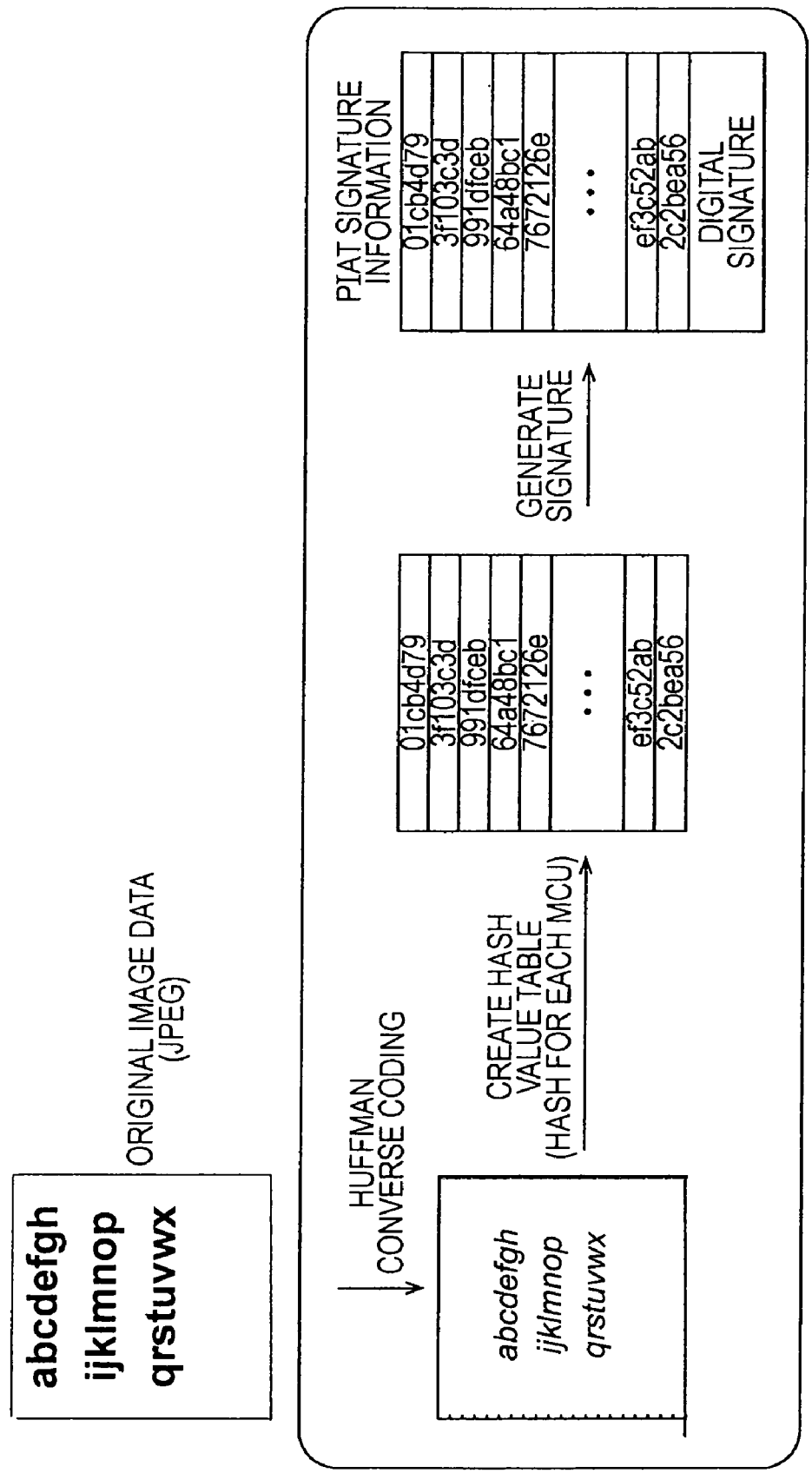
FIG. 18 illustrates an operation for generating PIAT signature information for original image data.

FIG. 18 illustrates an operation for generating the PIAT signature information for the original image data. The generated PIAT signature information is accumulated/stored in the document management DB 31 through the document management TB 33 as PIAT signature information of the original image data (ST200-05).

The PIAT signature information may be stored in the original image data or may be stored as separate data.

A digital signature included in the PIAT signature information illustrated in FIG. 18 is a signature attached to the entire PIAT signature information. This signature may correspond to a digital signature of the signing person and may be used for identifying a creator of the original image data and detecting the tampering. In general, under the electronic document law, this digital signature has to belong to the scanning person. However, in exemplary embodiment, the scanning person and the signing person are different and a description are given for a case where a creator of the original image data is the signing person.

Meanwhile, although attachment of a timestamp that allows a creation time of the original image data to be proven by a third party is omitted in exemplary embodiment, it is desirable to attach the timestamp in practice for the stronger credibility. After the completion of accumulation/storage, a completion notification may be transmitted to the signing person's terminal 6 through the communicator 37 (ST200-06).

Upon the signing person's terminal 6 receiving the completion notification (ST200-07), the signing person confirms that there is no error and terminates the operation of ST200.

In response to an instruction for extracting the original image data entered from the concealing person (ST300-01), the concealing person's terminal 7 accesses the document management server 3. The document management server 3 receives the extraction instruction through the communicator 37 (ST300-02). The document management server 3 extracts the accumulated/stored original image data scanned by the scanning person from the document management DB 31 through the document management TB 33 (ST300-03). The extracted original image data may be transmitted to the concealing person's terminal 7 through the communicator 37 (ST300-04).

Upon receiving the original image data from the document management server 3 (ST300-05), the concealing person's terminal 7 displays the original image data on a display device included in the concealing person's terminal 7. The concealing person selects a portion to be concealed with a rectangle (ST300-06).

After the completion of the rectangular selection of the portion to be concealed, the concealing person's terminal 7 transmits information regarding the selected portion to be concealed to the document management server 3 again (ST300-07). The document management server 3 receives the information regarding the selected portion to be concealed through the communicator 37 (ST300-08).

Figure 19:
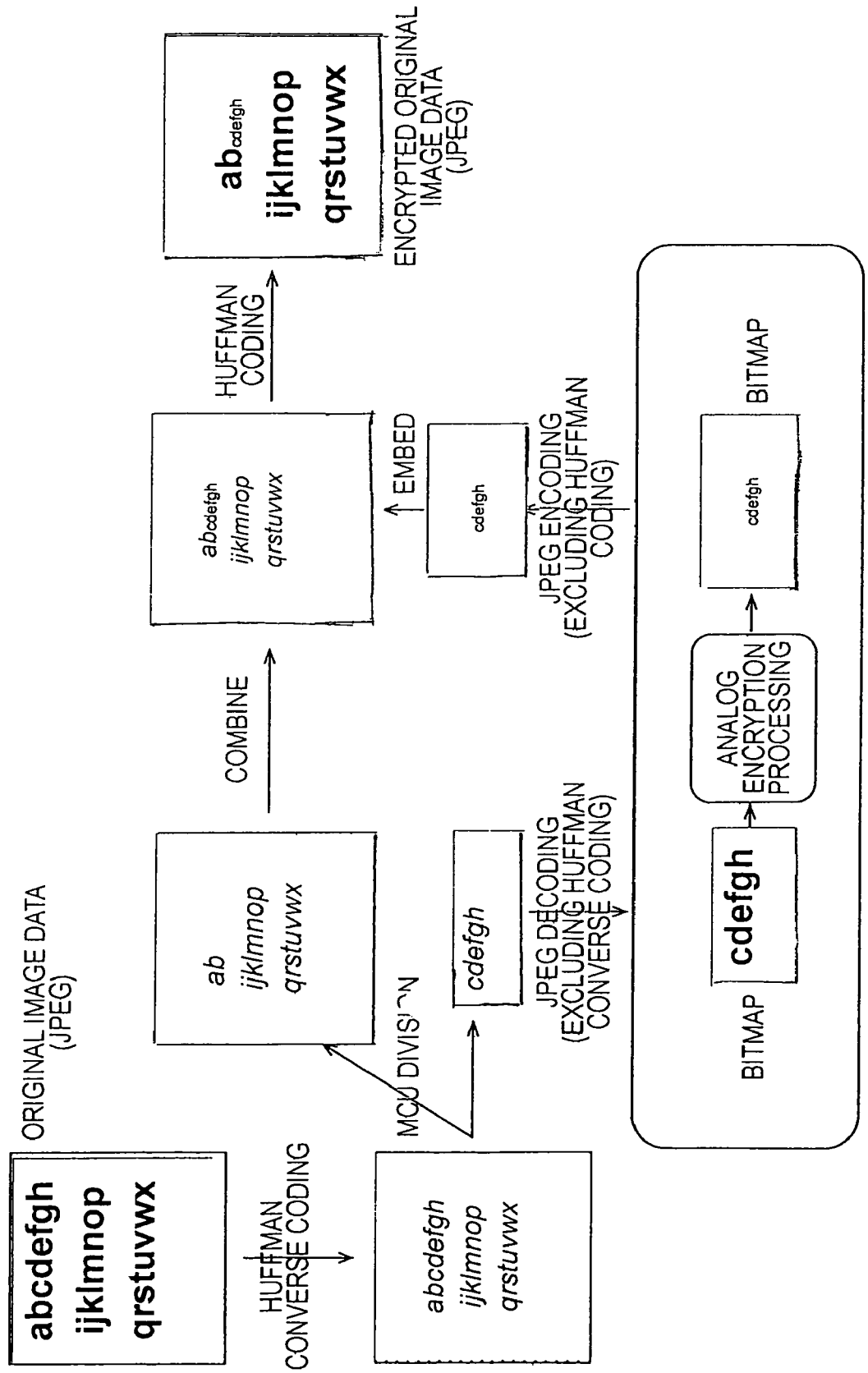
FIG. 19 illustrates an image encryption operation according to a print encryption technology.

The document management server 3 conceals the selected portion to be concealed through the concealing processing unit 35 (ST300-09). More specifically, the concealing processing unit 35 performs a print encryption operation on the selected portion using a print encryption technology (STR310). FIG. 19 illustrates an image encryption operation according to a print encryption technology. First, Huffman converse coding is performed on the original image data (JPEG data) and the original image data is divided into MCUs of a partially concealed area and a disclosed area.

A JPEG decoding operation (excluding the Huffman converse coding) is performed on the partially concealed area to obtain bitmap data. The bitmap data is encrypted in an analog image encryption operation. A JPEG encoding operation (excluding Huffman coding) is performed on the encrypted bitmap data to obtain JPEG data. The JPEG data is combined/embedded the disclosed area information.

After performing the Huffman coding, the encrypted original image data is output. The output encrypted original image data is accumulated/stored in the document management DB 31 through the document management TB 33 (STR320). At this time, the original image data may be overwritten or may be managed as another version of data.

Figure 20:
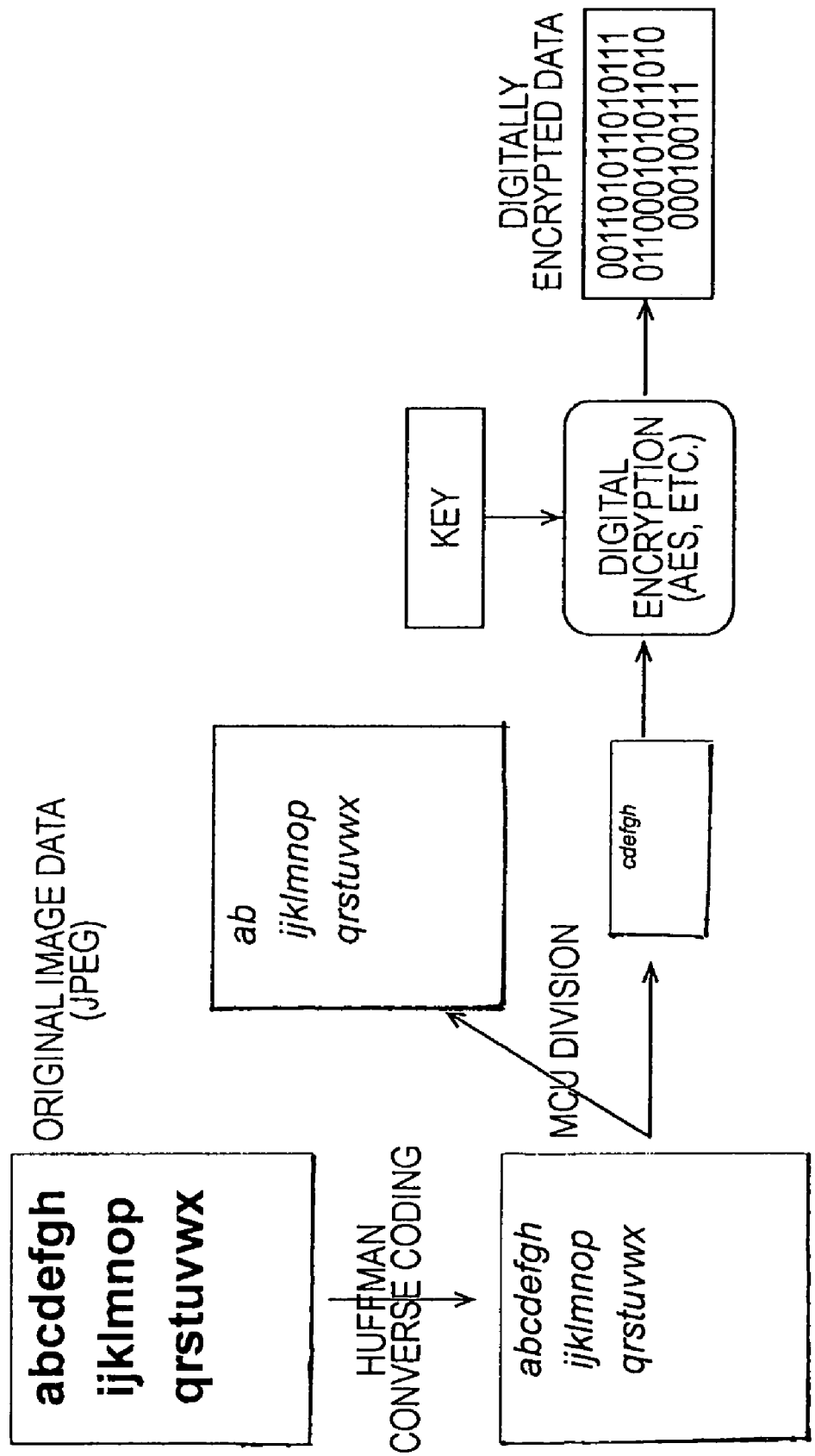
FIG. 20 illustrates an image encryption operation according to a digital encryption technology.

A digital encryption operation is performed on the selected portion to be concealed using a digital encryption technology (STD310). FIG. 20 illustrates an image encryption operation according to a digital encryption technology.

As in the case of STR310, the Huffman converse coding is performed on the original image data (JPEG data) and the original image data is divided into MCUs of a partially concealed portion and a disclosed portion. An encryption operation is performed on the information of the partially concealed area using a digital encryption technology, such as AES, to output digitally encrypted data. The output digitally encrypted data is accumulated/stored in the document management DB 31 through the document management TB 33 (STD320).

As in the case of the PIAT signature information, this digital encryption data may be stored in the encrypted original image data or may be stored as separate data. In addition, a key used in this digital encryption operation differs depending on the employed encryption method. A common key may be used in the AES common key cryptosystem, whereas a public key may be used in the RSA public key cryptosystem. Additionally, when a common key may be used, the common key has to be managed a given secure area. In addition, an encryption key is accumulated/managed in the key management DB 32 of the document management server 3. Although the management method and the access control method of the key management DB 32 are required, a description thereabout is omitted here.

After the completion of the above-described operation, the document management server 3 transmits a completion notification to the concealing person's terminal 7 through the communicator 37 (ST300-10). Upon the concealing person's terminal 7 receiving the completion notification (ST300-11), the concealing person confirms that there is no error and terminates the operations of ST300, STR310, STD310, STR320, and STD320.

After the completion of the above-described operation, the process proceeds to an operation performed by the disclosing person. The disclosing person selects a person to whom the original image data is disclosed and a disclosure method (through both of or one of a paper medium and an electronic medium) (ST400).

Disclosure through a paper medium is described. In response to an instruction for extracting the original image data entered by the disclosing person (STR410-01), the disclosing person's terminal 8 accesses the document management server 3. The document management server 3 receives the extraction instruction through the communicator 37 (STR410-02). The document management server 3 extracts the accumulated/stored original image data encrypted by the concealing person from the document management DB 31 through the document management TB 33 (STR410-03).

The extracted encrypted original image data may be transmitted to the disclosing person's terminal 8 through the communicator 37 (STR410-04). Upon receiving the encrypted original image data from the document management server 3 (STR410-05), the disclosing person's terminal 8 displays the data on a display device included in the disclosing person's terminal 8.

In response to the disclosing person's operation, a print instruction may be transmitted to the printer 9 (STR410-06). Upon receiving the print instruction from the disclosing person's terminal 8, the printer 9 prints/outputs the original image data on a paper (STR410-07). The disclosing person receives the encrypted original image printed on a paper (STR410-08) and discloses the original image offline by mailing or personally delivering the printed original image to the browsing person or the verifying person (STR410-09). The browsing person or the verifying person receives the encrypted original image (through the paper medium) disclosed offline (STR410-10). Operations performed hereafter differ depending on whether the receiving person is the browsing person or the verifying person (STR420).

The browsing person checks the content of the paper medium received from the disclosing person with their eyes (STR431). At this time, the browsing person cannot browse the concealed portion but can browse the content of the rest. The operation of the browsing person is then terminated.

An operation of the verifying person will now be described. There are two kinds of verifying persons, namely, those having a right to decrypt the encrypted concealed portion and those not having this right (STR432). The verifying person not having the decryption right (NO of STR432), like the browsing person, checks the content of the paper medium received from the disclosing person with their eyes (STR433). At this time, the verifying person cannot verify the concealed portion but can verify the content of the rest. The operation of the verifying person not having the decryption right is then terminated.

The verifying person having the decryption right (YES of STR432) sets the paper media received from the disclosing person in the scanner 12 and issues an image scan instruction using the browsing/verifying person's terminal 11 (STR440-01). In response to the image scan instruction transmitted from the browsing/verifying person's terminal 11, the scanner 12 scans and digitalizes the image on the paper medium. The scanned encrypted original image data is converted into a JPEG format (STR440-02).

The JPEG-format encrypted original image data may be transmitted to the browsing/verifying person's terminal 11 and is displayed on a display device included in the browsing/verifying person's terminal 11 (STR440-03). The verifying person then issues a decryption instruction to the document management server 10 using the browsing/verifying person's terminal 11 (STR450-01).

At this time, the output encrypted original image data may be transmitted along with the decryption instruction. The document management server 10 receives the decryption instruction through the communicator 107 (STR450-02). Upon receiving the decryption instruction, the document management server 10 performs an analog decryption operation on the transmitted encrypted original image data (STR450-03).

Figure 21:
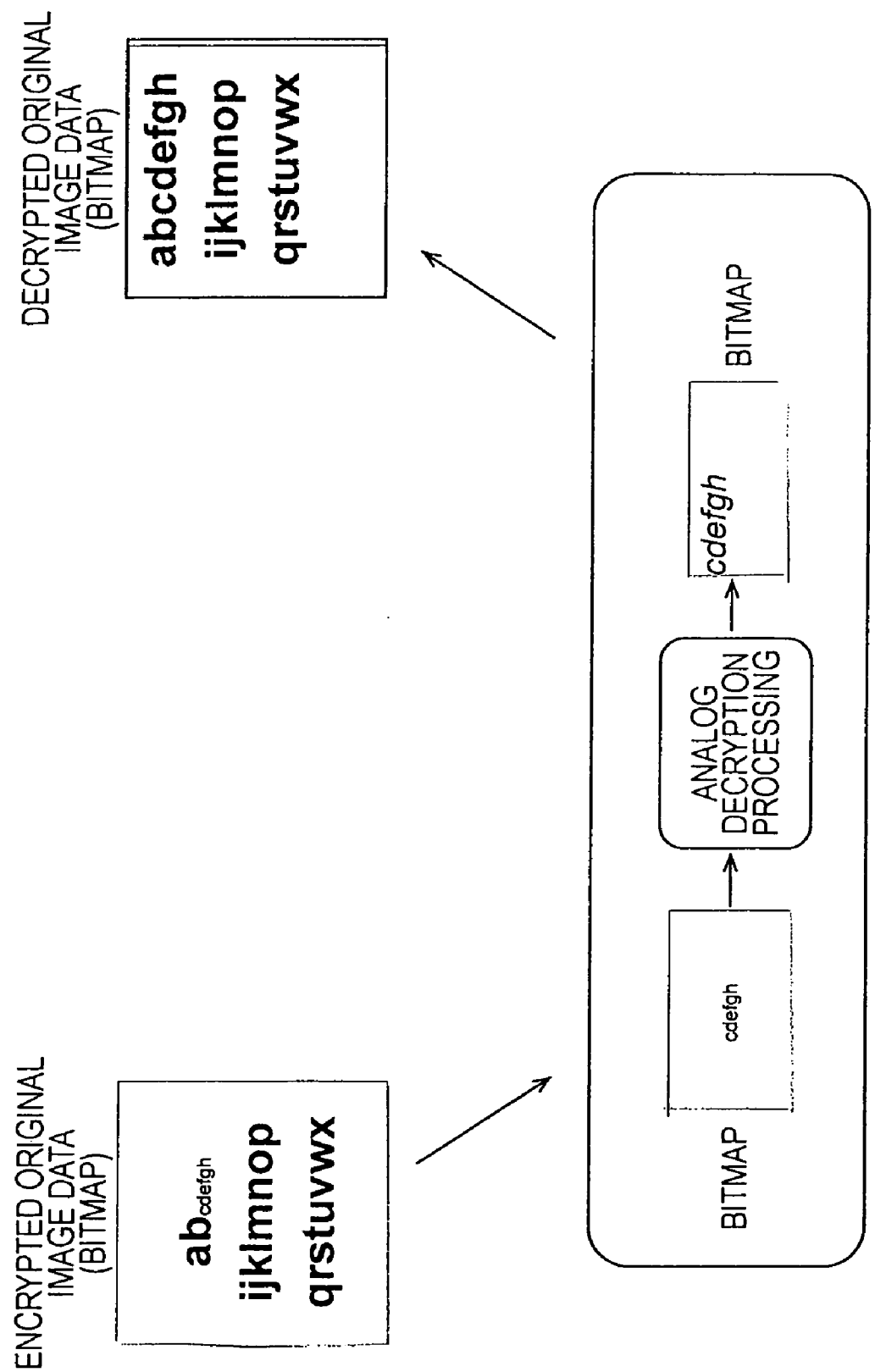
FIG. 21 illustrates an image decryption operation according to a print encryption technology.

FIG. 21 illustrates an image decryption operation according to a print encryption technology. First, an analog decryption operation is performed utilizing the output bitmap-format image data. The decrypted bitmap-format data is output as the decrypted original image data. The output decrypted original image data may be accumulated/stored in the document management DB 101 through the document management TB 103.

After the completion of the above-described operation, the document management server 10 transmits the decrypted original image data to the browsing/verifying person's terminal 11 through the communicator 107 (STR450-04). Upon receiving the decrypted original image data (STR450-05), the browsing/verifying person's terminal 11 displays the data on a display device included in the browsing/verifying person's terminal 11.

The verifying person checks the content of the decrypted original image data, the concealed part of which may be decrypted, with their eyes (STR460). The decryption key may be provided to the verifying person having the decryption right from the concealing person in some way and is accumulated/stored in the key management DB 102 of the document management server 10. Although the management method and the access control method of the key management DB 102 are required, a description thereabout is omitted here. After the completion of all of these operations, the operation of STR410, STR420, STR431, STR432, STR433, STR440, STR450, and STR460 is terminated.

The disclosure through an electronic medium will now be described. In response to an instruction for extracting the original image data entered by the disclosing person (STD410-01), the disclosing person's terminal 8 accesses the document management server 3. The document management server 3 receives the extraction instruction through the communicator 37 (STD410-02).

The document management server 3 extracts three pieces of information, namely, the encrypted original image data, the PIAT signature information, and the digitally encrypted data, from the document management DB 31 through the document management TB 33 (STD410-03).

At this time, if the PIAT signature information and the digitally encrypted data are collectively included in the encrypted original image data, only the encrypted original image data is disclosed. If the PIAT signature information and the digitally encrypted data are separated from the encrypted original image data, the three pieces of information, namely, the encrypted original image data, the PIAT signature information, and the digitally encrypted data, are disclosed.

A case where the PIAT signature information and the digitally encrypted data are separated from the encrypted original image data is described. The extracted three pieces of information, i.e., the encrypted original image data, the PIAT signature information, and the digitally encrypted data, are transmitted to the disclosing person's terminal 8 through the communicator 37 (STD410-04).

The disclosing person's terminal 8 receives the three pieces of information, i.e., the encrypted original image data, the PIAT signature information, and the digitally encrypted data, from the document management server 3 (STD410-05) and displays the encrypted original image data on a display device included in the disclosing person's terminal 8. The disclosing person checks the content of the displayed encrypted original image data and discloses the three pieces of information, i.e., the encrypted original image data, the PIAT signature information, and the digitally encrypted data, to the browsing person or the verifying person online using an online medium, such as an email and a shared server, or using a medium, such as a portable medium (USB memory) (STD410-06).

In this online disclosure, the three pieces of information are transmitted to the document management server 10 on the side of the browsing/verifying person. The document management server 10 receives the three pieces of information, i.e., the encrypted original image data, the PIAT signature information, and the digitally encrypted data, through the communicator 107 (STD410-07) and accumulates/stores the information in the document management DB 101 through the document management TB 103 (STD410-08).

The document management server 10 notifies the browsing person or the verifying person of a message indicating existence of online disclosed information through the browsing/verifying person's terminal 11 in some way (STD410-09). Operations performed hereafter differ depending on whether the receiving person is the browsing person or the verifying person (STD420).

The browsing person receives the encrypted original image data disclosed by the disclosing person from the document management server 10 (STD410-10). The encrypted original image data is displayed on a display device included in the browsing/verifying person's terminal 11. The browsing person checks the content thereof with their eyes (STD431). At this time, the browsing person cannot browse the concealed portion but can browse the content of the rest. The operation of the browsing person is then terminated.

Verifying persons include those having a right to decrypt the encrypted concealed portion and those not having the decryption right (STD432).

The verifying person not having the decryption right transmits a request for verifying the PIAT signature information to the document management server 10 (STD432-01). The document management server 10 receives the PIAT signature verification request through the communicator 107 (STD432-02).

The document management server 10 verifies the PIAT signature information for the encrypted original image data (STD450). More specifically, the document management server 10 extracts the accumulated/stored encrypted original image data from the document management DB 101 through the document management TB 103. The signature generating unit 104 then generates PIAT signature information for the encrypted original image data using the above-described JPEG-PIAT method.

Figure 22:
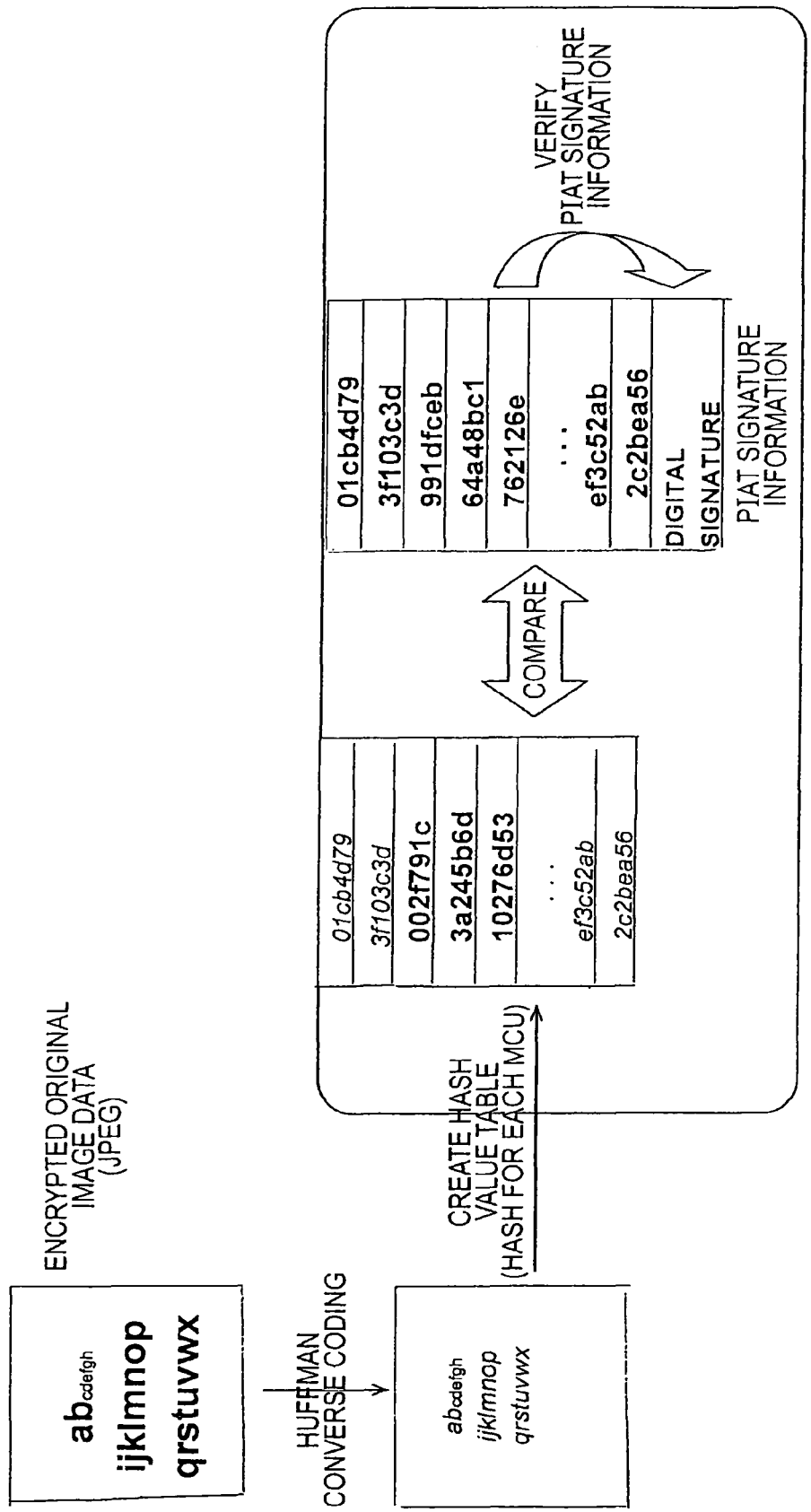
FIG. 22 illustrates a PIAT signature information verification operation of encrypted original image data.

The document management server 10 then compares the generated PIAT signature information with the accumulated/stored PIAT signature information. FIG. 22 illustrates an operation for verifying the PIAT signature information of the encrypted original image data. More specifically, the document management server 10 performs comparison regarding all of hush values generated for respective MCUs.

This verification result may be transmitted to the browsing/verifying person's terminal 11 through the communicator 107 (STD460-01). Upon receiving the verification result (STD460-02), the browsing/verifying person's terminal 11 can display a result illustrated in FIG. 23 on a display device included in the browsing/verifying person's terminal 11 (STD460-03).

More specifically, the verifying person can confirm that a partially concealed portion resulting from the encryption operation is altered from the original image data and the rest is not altered.

Figure 23:
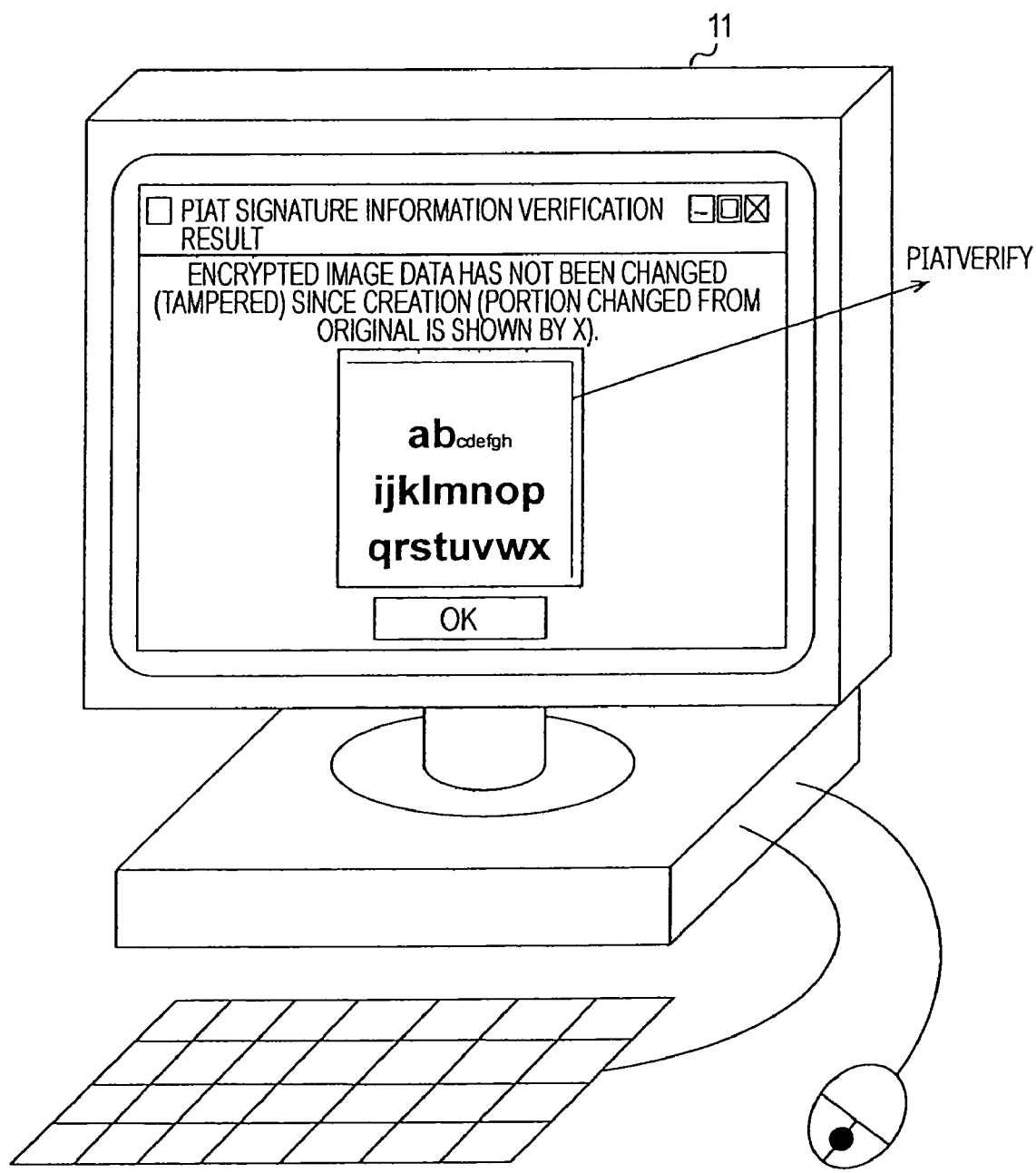
FIG. 23 illustrates a signature verification result of encrypted original image data.

For example, a portion having different hush values is displayed with an X (corresponding to a PIAT VERIFY portion illustrated in FIG. 23). At this time, the verifying person cannot verify the concealed portion but can verify the content of the rest. The operation of the verifying person not having the decryption right is then terminated.

The verifying person having the decryption right transmits a request for performing a digital decryption operation to the document management server 10 using the browsing/verifying person's terminal 11 (STD440-01). The document management server 10 receives the digital decryption operation request through the communicator 107 (STD440-02). The document management server 10 performs the digital decryption operation on the encrypted original image data (STD440-03). More specifically, the document management server 10 extracts the stored encrypted original image data and the digitally encrypted data from the document management DB 101 through the document management TB 103.

The decryption processing unit 105 then performs the digital decryption operation to decrypt the concealed portion. More specifically, the decryption processing unit 105 decrypts the encrypted original image data digitally encrypted at STD310 using the digitally encrypted data to restore the original image data.

Figure 24:
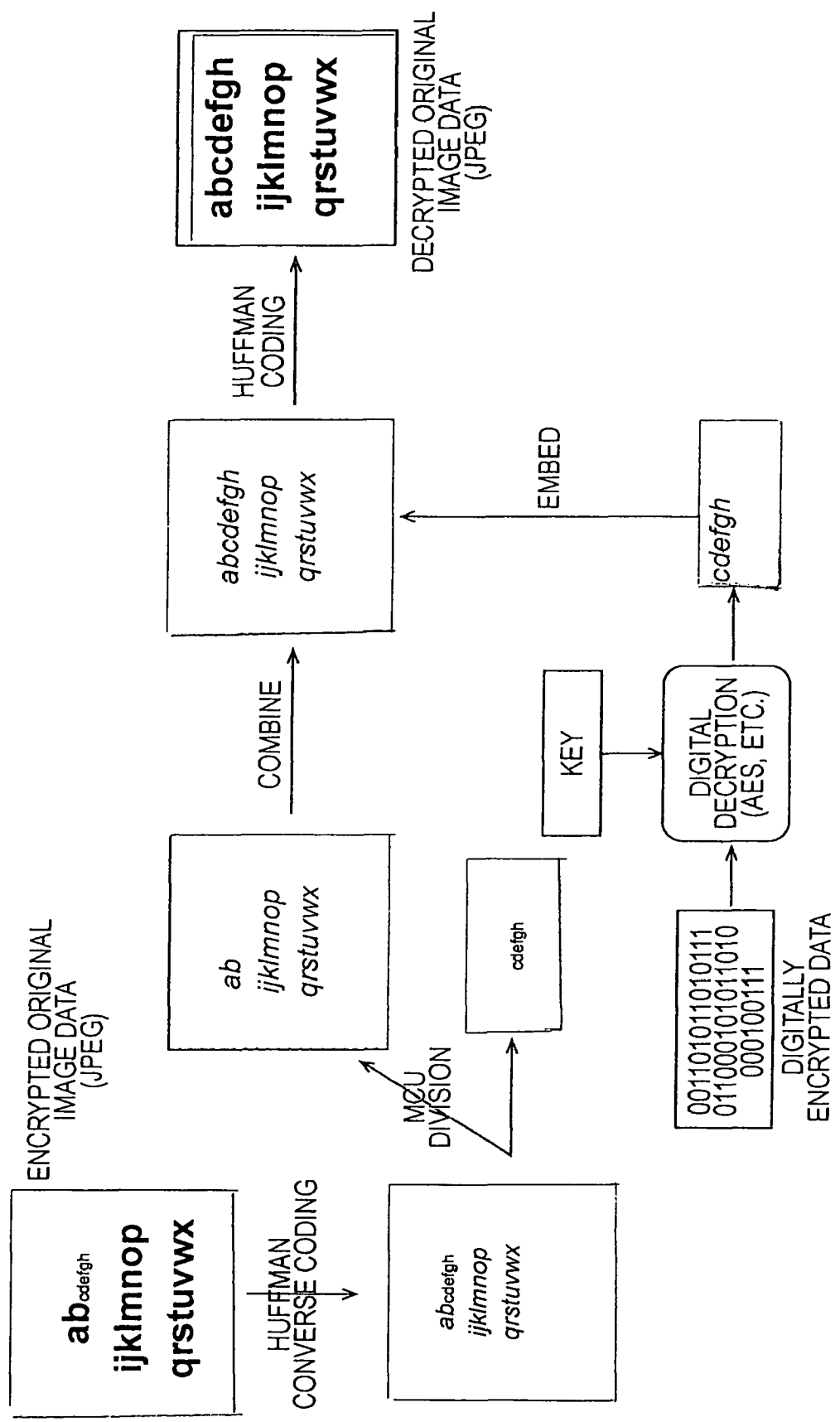
FIG. 24 illustrates an image decryption operation according to a digital encryption technology.

FIG. 24 illustrates an image decryption operation according to a digital encryption technology. The Huffman converse coding is performed on the encrypted original image data (JPEG data) and the original image data is divided into MCUs of a partially concealed area and a disclosed area. The decryption operation is performed on the information of the partially concealed area using a digital encryption technology, such as the AES. The output information is combined/embedded in the disclosed area information.

In addition, a key used in this decryption operation differs depending on the employed encryption method. A common key may be used in the AES common key cryptosystem, whereas a public key may be used in the RSA public key cryptosystem. The Huffman coding is then performed and the decrypted original image data is output. Additionally, in this case, a decryption key may be provided to the verifying person having the decryption right from the concealing person in some way and is accumulated/managed in the key management DB 102 of the document management server 10. Although the management method and the access control method of the key management DB 102 are required, a description thereabout is omitted here.

The output decrypted original image data is accumulated/stored in the document management DB 101 as decrypted original image data through the document management TB 103.

The PIAT signature verification operation is then performed on the decrypted original image data (STD450). More specifically, the signature generating unit 104 generates PIAT signature information for the decrypted original image data using the above-described JPEG-PIAT method. The generated PIAT signature information is then compared with the accumulated/stored PIAT signature information.

Figure 25:
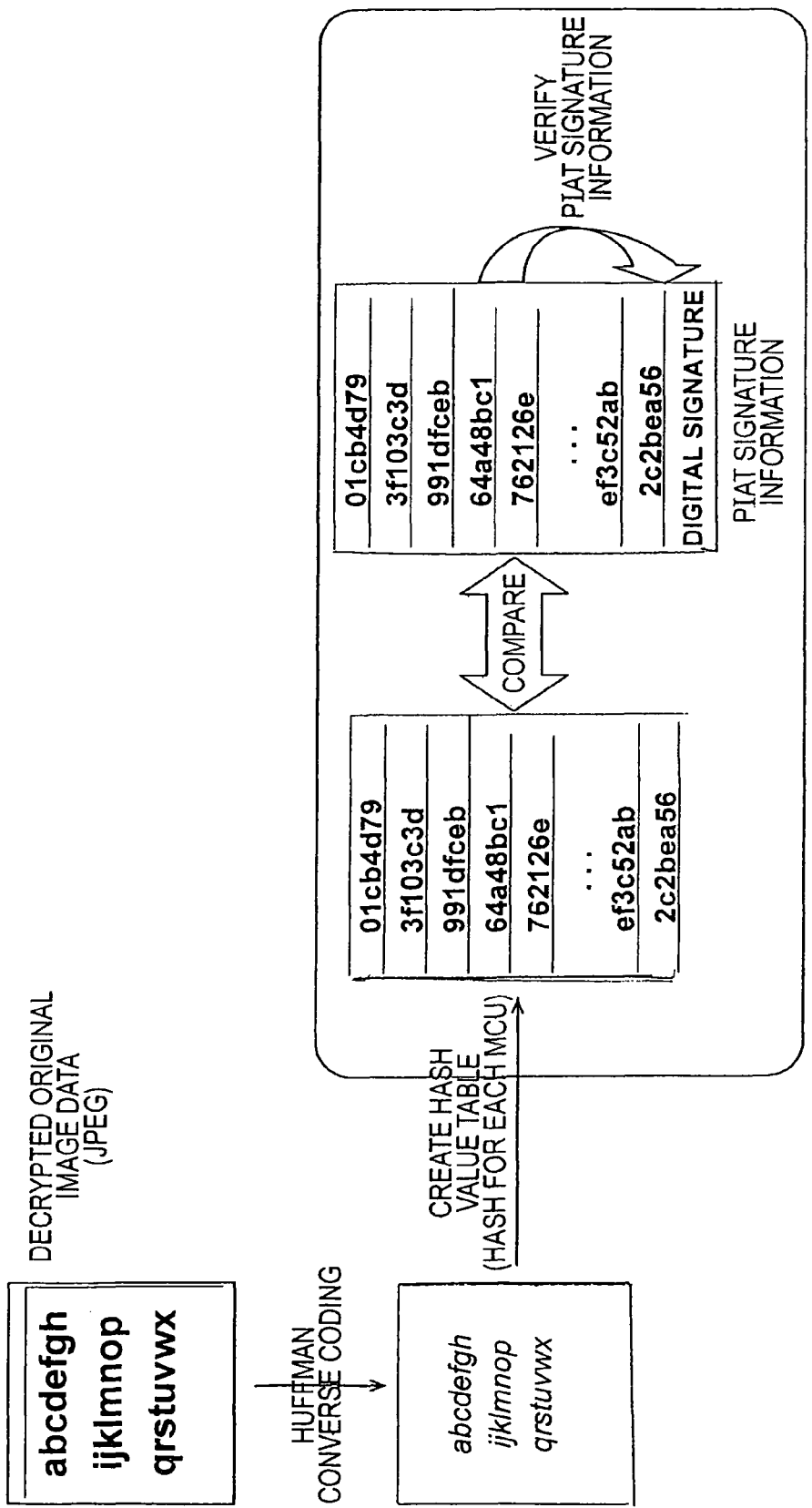
FIG. 25 illustrates a signature verification result of decrypted original image data.

FIG. 25 illustrates a PIAT signature information verification operation performed on the decrypted original image data. Comparison is performed regarding all of hush values generated for respective MCUs. More specifically, comparison is performed regarding all of hush values generated for respective MCUs to determine whether the hush values match.

Figure 26:
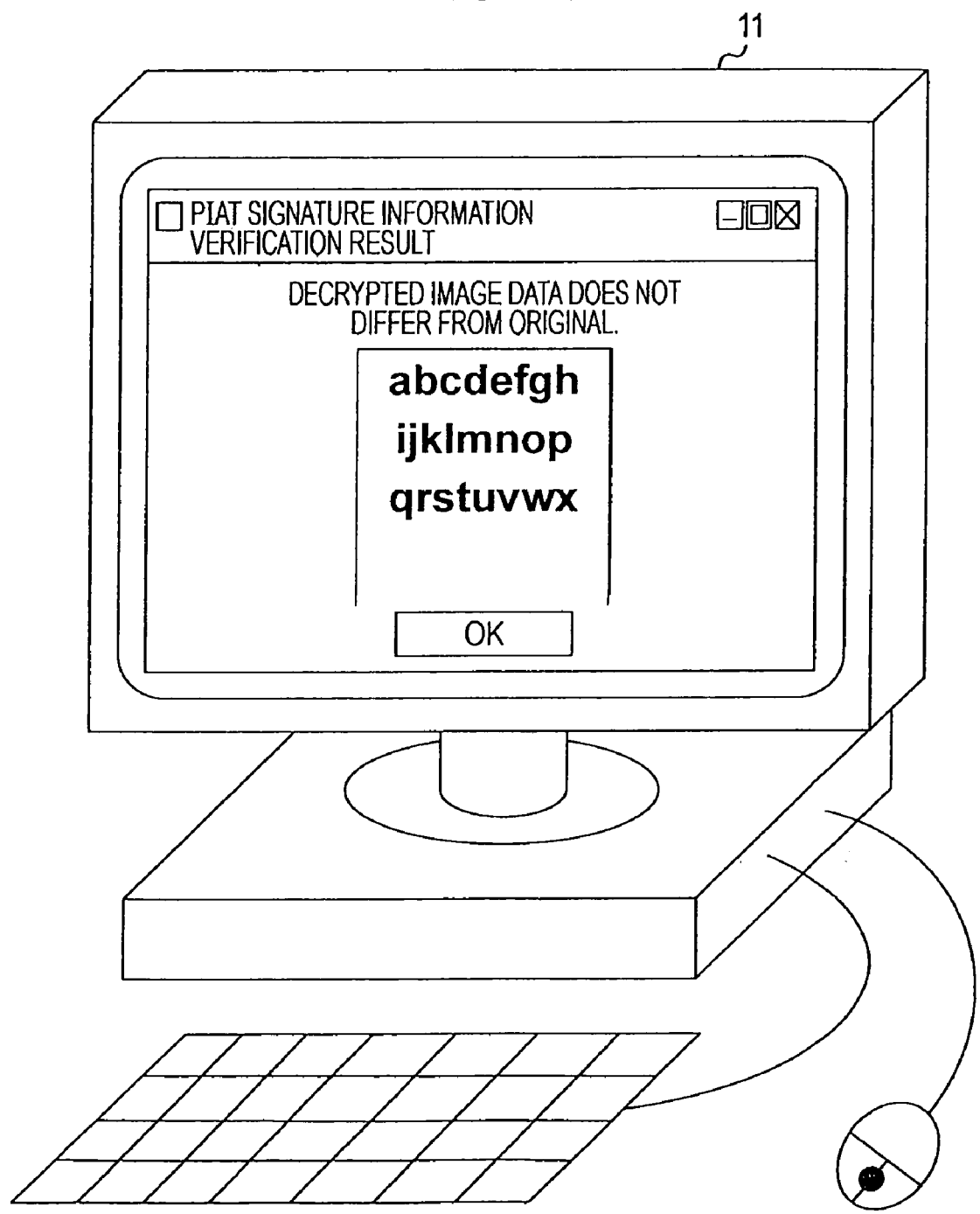
FIG. 26 illustrates a signature verification result of decrypted original image data.

This verification result may be transmitted to the browsing/verifying person's terminal 11 through the communicator 107 (STD460-01). Upon receiving the verification result (STD460-02), the browsing/verifying person's terminal 11 can display a result illustrated in FIG. 26 on a display device included in the browsing/verifying person's terminal 11 (STD460-03).

More specifically, if the verification result indicates agreement, the verifying person can confirm that the decrypted original image data matches the original image data. If a portion having different hush values is displayed with an X in the verification result, the verifying person can determine that the original image data is altered in some way.

Furthermore, after the disclosure/verification through the electronic medium, the encrypted original image data or the decrypted original image data may be reused (STD500). Furthermore, after partially concealing the encrypted original image data or the decrypted original image data, the image data can be disclosed to another browsing person or another verifying person. At this time, the original verifying person serves as the concealing person.

As described above, according to the embodiments, it is possible to perform disclosure through both of a paper medium and an electronic medium and partial authenticity verification, which cannot be realized in the related art.

By providing programs that allow a computer to execute each operation illustrated in the flowcharts and the operations illustrated in the embodiments, electronic document management programs according to an aspect of the present invention can be provided. These programs can be recorded on a computer-readable medium and executed by a computer. The types of the computer include a host device, such as a personal computer, a controller of a test device, and a controller, such as an MPU and a CPU, of a storage device. Here, types of the computer-readable medium include portable storage media such as a CD-ROM, a flexible disk, a DVD, a magneto-optical disk, and an IC card, a database holding computer programs, other computers and databases therefor, and transmission media on a network.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A non-transitory computer readable medium having stored therein a program to cause a computer to execute an operation, the operation comprising:
    registering, as original image data, image data of an original scanned by a scanner;
    extracting, from the registered original image data, partial information regarding each part of information forming the original image data, generating a feature value of each piece of the partial information, generating signature information including a set of the feature values and a signature attached to the set of the feature values, and registering the signature information in association with the original image data;
    performing, a print encryption operation on a portion to be concealed and registering partially print-encrypted original image data, and performing a digital encryption operation on the portion to be concealed and registering the digitally encrypted data, the print encryption operation allowing the original image to be yielded by decrypting a printed image of print-encrypted original image data;
    printing the original image data in response to a request to disclose the original image data that is encrypted and the portion as print data in accordance with the print encrypted original image data, and providing, in response to a request to disclose the original image data that is encrypted by an electronic medium, original image data in accordance with the digitally encrypted data.

2. The non-transitory computer readable medium according to claim 1, where the operation comprises:
    acquiring, image data obtained by scanning a paper medium containing a printed image of the print data by a scanner, decrypting a portion corresponding to the concealed portion encrypted in the print encryption operation, and providing the decrypted image data.

3. The non-transitory computer readable medium according to claim 2, where the operation comprises:
    extracting, in response to a verification request not involving decryption of the electronic medium data of the encrypted original image data, partial information regarding each part of information forming the original image data as encrypted, generating a feature value of each piece of the partial information, comparing the generated feature values with the respective feature values included in the signature information registered at the signature information registration operation, and providing the comparison results, and decrypting.

4. The non-transitory computer readable medium according to claim 3, where the operation comprises:
    in response to a verification request involving decryption of the electronic medium data of the original image data encrypted, the digitally encrypted concealed portion of the original image data encrypted provided at the disclosure operation, and providing the decrypted image data.

5. The non-transitory computer readable medium according to claim 1, where the operation comprises:
    extracting, in response to a verification request not involving decryption of the electronic medium data of the original image data encrypted, partial information regarding each part of information forming the original image data encrypted, generating a feature value of each piece of the partial information, comparing the generated feature values with the respective feature values included in the signature information registered at the signature information registration operation, and providing the comparison results, and decrypting.

6. The non-transitory computer readable medium according to claim 5, wherein:
    in response to a verification request involving decryption of the electronic medium data of the original image data encrypted, the digitally encrypted concealed portion of the original image data encrypted provided at the disclosure operation, and providing the decrypted image data.

7. The non-transitory computer readable medium according to claim 1, where the operation comprises:
    embedding the digitally encrypted concealed portion in the original image data and registering the concealed-portion-containing original image data as encrypted.

8. An image verification method for a computer for executing an image verification operation, the method comprising:
    registering, as original image data, image data of an original scanned by a scanner;
    extracting, from the registered original image data, partial information regarding each part of information forming the original image data, generating a feature value of each piece of the partial information, generating signature information including a set of the feature values and a signature attached to the set of the feature values, and registering the signature information in association with the original image data;
    performing, a print encryption operation on a portion to be concealed and registering partially print-encrypted original image data, and performing a digital encryption operation on the portion to be concealed and registering the digitally encrypted data, the print encryption operation allowing the original image to be yielded by decrypting a printed image of print-encrypted original image data;
    printing the original image data in response to a request to disclose the original image data that is encrypted and the portion as print data in accordance with the print encrypted original image data, and providing, in response to a request to disclose the original image data encrypted by an electronic medium, the original image data in accordance with the digitally encrypted data.

9. An image data verification system for verifying image data using a computer, the system comprising:
    an original registering unit that registers, as original image data, image data of an original scanned by a scanner;

a signature information registering unit that extracts, from the original image data registered by the original registering unit, partial information regarding each part of information forming the original image data, generates a feature value of each piece of the partial information, generates signature information including a set of the feature values and a signature attached to the set of the feature values, and registers the signature information in association with the original image data;

an encrypting unit that performs, when at least part of the original image data is concealed, a print encryption operation on a portion to be concealed and registers partially print-encrypted original image data, and that performs a digital encryption operation on the portion to be concealed and registers the digitally encrypted data, the print encryption operation allowing the original image to be yielded by decrypting a printed image of print-encrypted original image data;

a disclosing unit that prints, in response to a request to disclose the original image data that is encrypted and the portion as print data in accordance with the print-encrypted original image data, and that provides, in response to a request to disclose the original image data encrypted by an electronic medium, the original image data as electronic medium data in accordance with the digitally encrypted data.

10. The non-transitory computer readable medium according to claim 1, where the portion to be concealed is a selected portion of the original image data indicated by a user, and the selected portion of the original image data encrypted is provided to the user.

\* \* \* \* \*